(12) United States Patent
Skaloud et al.

(10) Patent No.: US 11,001,443 B1
(45) Date of Patent: May 11, 2021

(54) DRAINAGE SYSTEM FOR A DELIVERY AUTONOMOUS GROUND VEHICLE

(71) Applicant: Amazon Technologies, Inc., Seattle, WA (US)

(72) Inventors: Brett Skaloud, Seattle, WA (US); Nicolas Hostein, Seattle, WA (US); Nicolas Kurczewski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 16/214,962

(22) Filed: Dec. 10, 2018

(51) Int. Cl.
  *B65G 1/04* (2006.01)
  *B62D 63/04* (2006.01)

(52) U.S. Cl.
  CPC ........... *B65G 1/0492* (2013.01); *B62D 63/04* (2013.01); *G05D 2201/0216* (2013.01)

(58) Field of Classification Search
  CPC ...... B60G 1/0492; B62D 23/00; B62D 63/04; B62D 63/02; B25J 9/0003
  USPC ........................................................ 296/208
  See application file for complete search history.

(56) References Cited

U.S. PATENT DOCUMENTS

| | | | |
|---|---|---|---|
| 10,343,286 B2 * | 7/2019 | Vain | B25J 11/008 |
| D866,393 S * | 11/2019 | Asai | D12/1 |
| D883,354 S * | 5/2020 | Jafarzadeh | D15/199 |
| 2006/0237239 A1 * | 10/2006 | Bruner | B62B 3/02 180/6.7 |
| 2018/0024554 A1 | 1/2018 | Brady et al. | |
| 2018/0194411 A1 * | 7/2018 | Liivik | B60G 5/01 |
| 2018/0232839 A1 * | 8/2018 | Heinla | G06Q 10/0832 |
| 2019/0106144 A1 * | 4/2019 | McCall | B65F 1/1468 |
| 2019/0106167 A1 * | 4/2019 | Niezgoda | B60K 7/0007 |
| 2019/0121368 A1 * | 4/2019 | Bussetti | G05D 1/0088 |
| 2020/0122797 A1 * | 4/2020 | Weiss | B62D 61/00 |
| 2020/0276915 A1 * | 9/2020 | Takahashi | B62D 63/02 |

* cited by examiner

*Primary Examiner* — Jason S Morrow
(74) *Attorney, Agent, or Firm* — BakerHostetler

(57) ABSTRACT

A delivery autonomous ground vehicle includes several drainage features to keep water away from the package to be delivered and sensitive components. The cargo bay includes dimples to raise the package from the floor of the bay and a drain. Enclosed drain pans beneath elements of the lid also include drains. Water entering from the cooling air inlet holes of discharge holes can drain back through the holes or through the main drain. Overlapping panels inhibit water ingress, but if provided without seals, the water ingress between overlapping panels flows to the main drain.

20 Claims, 22 Drawing Sheets

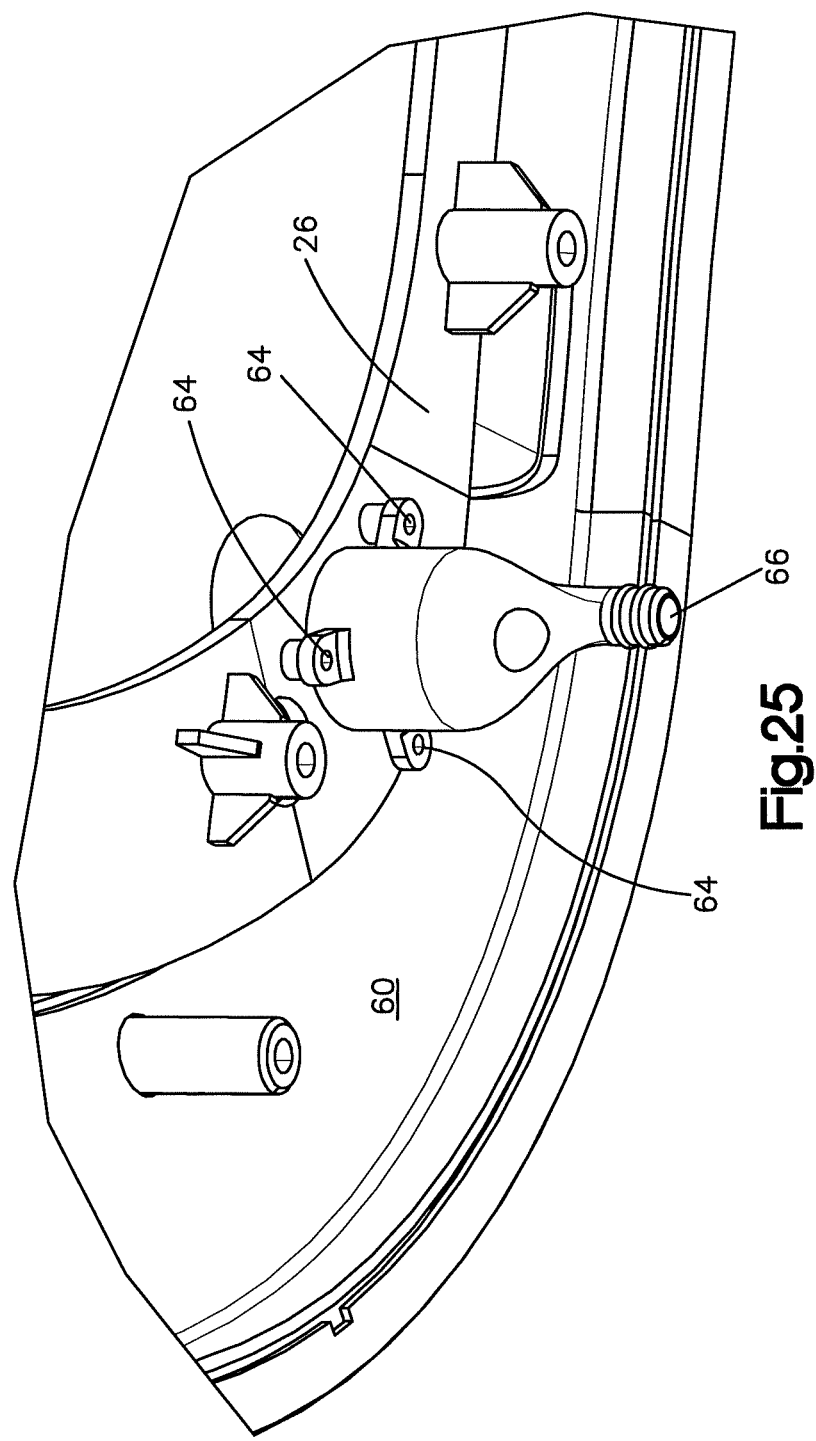

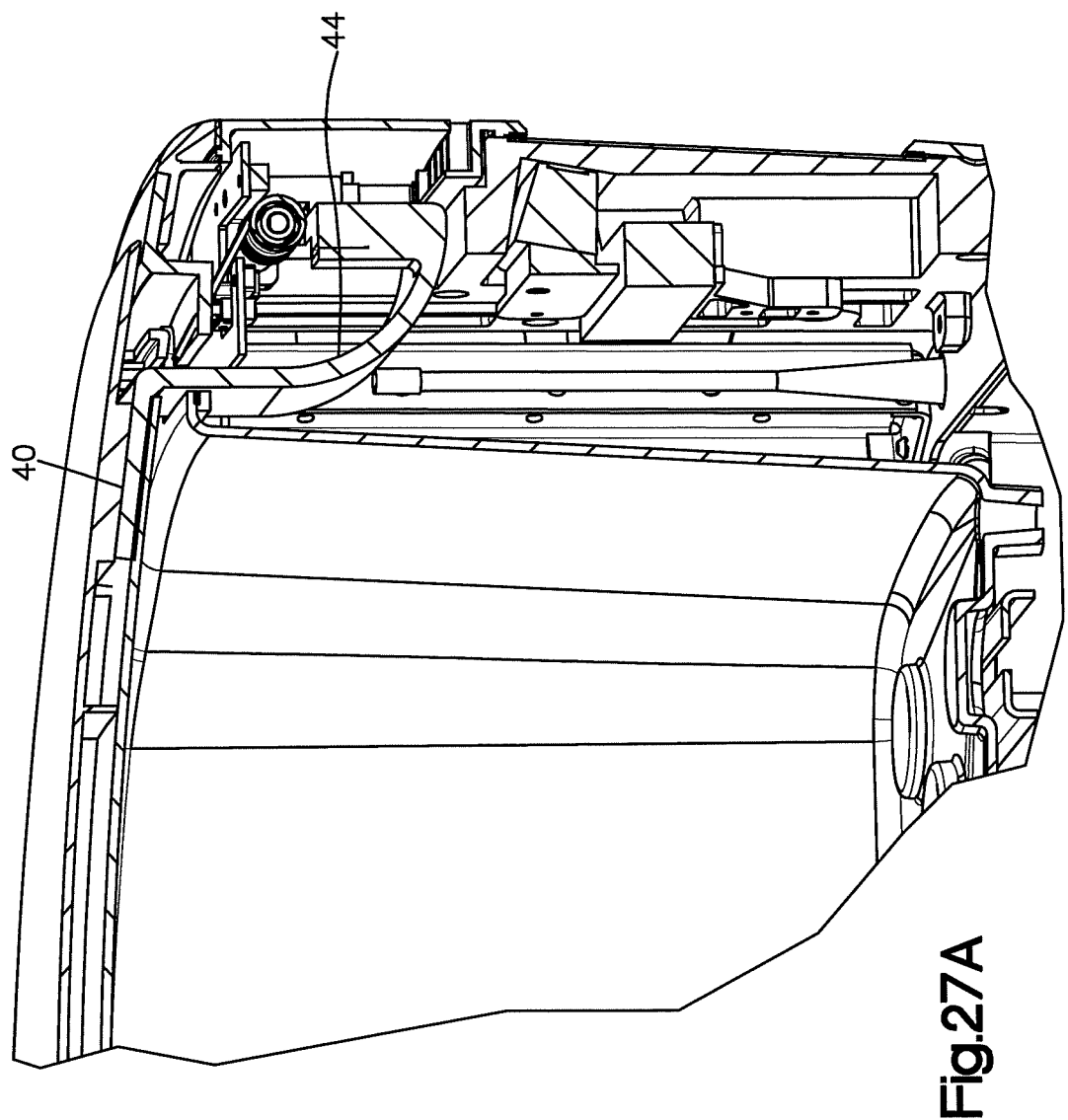

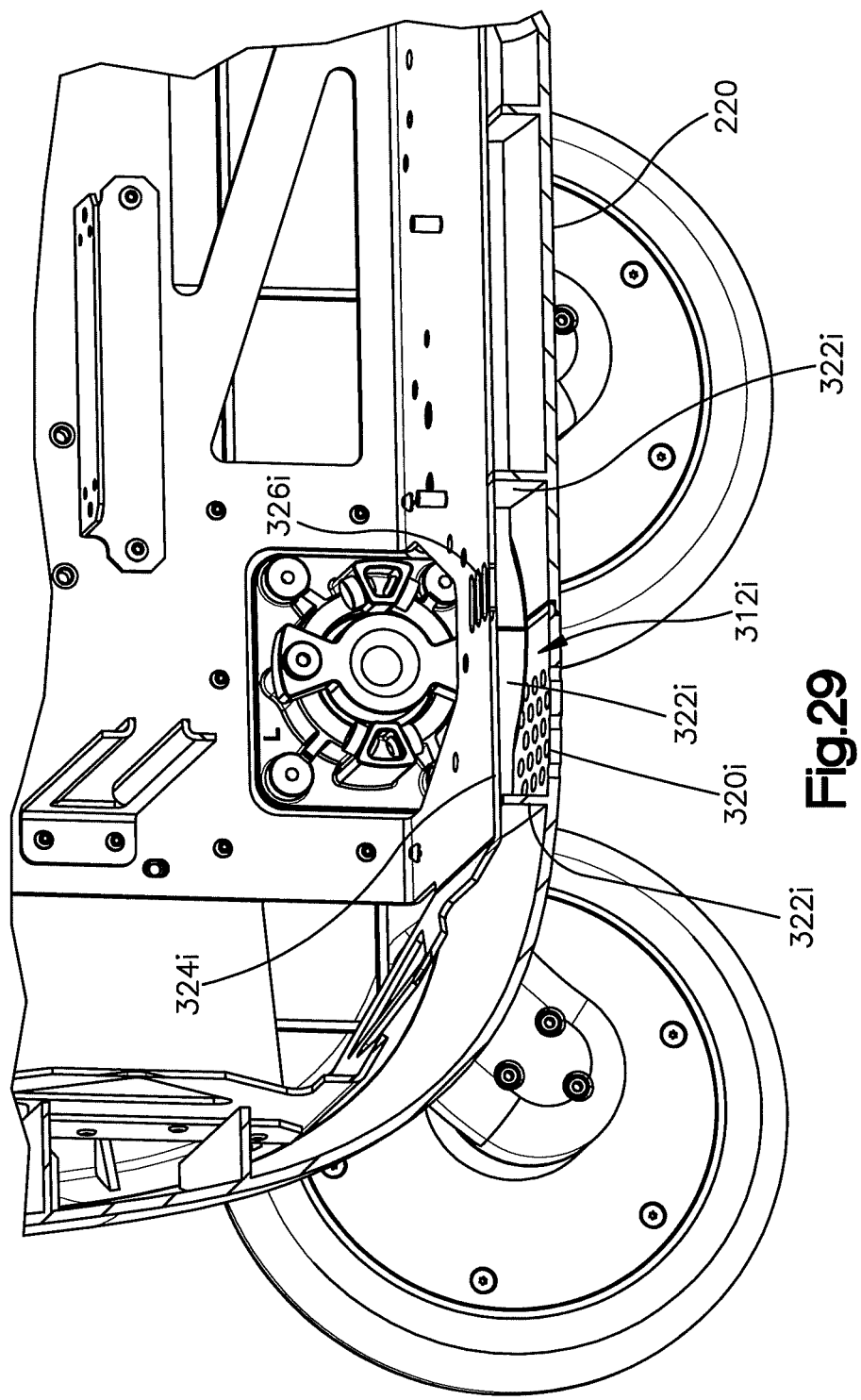

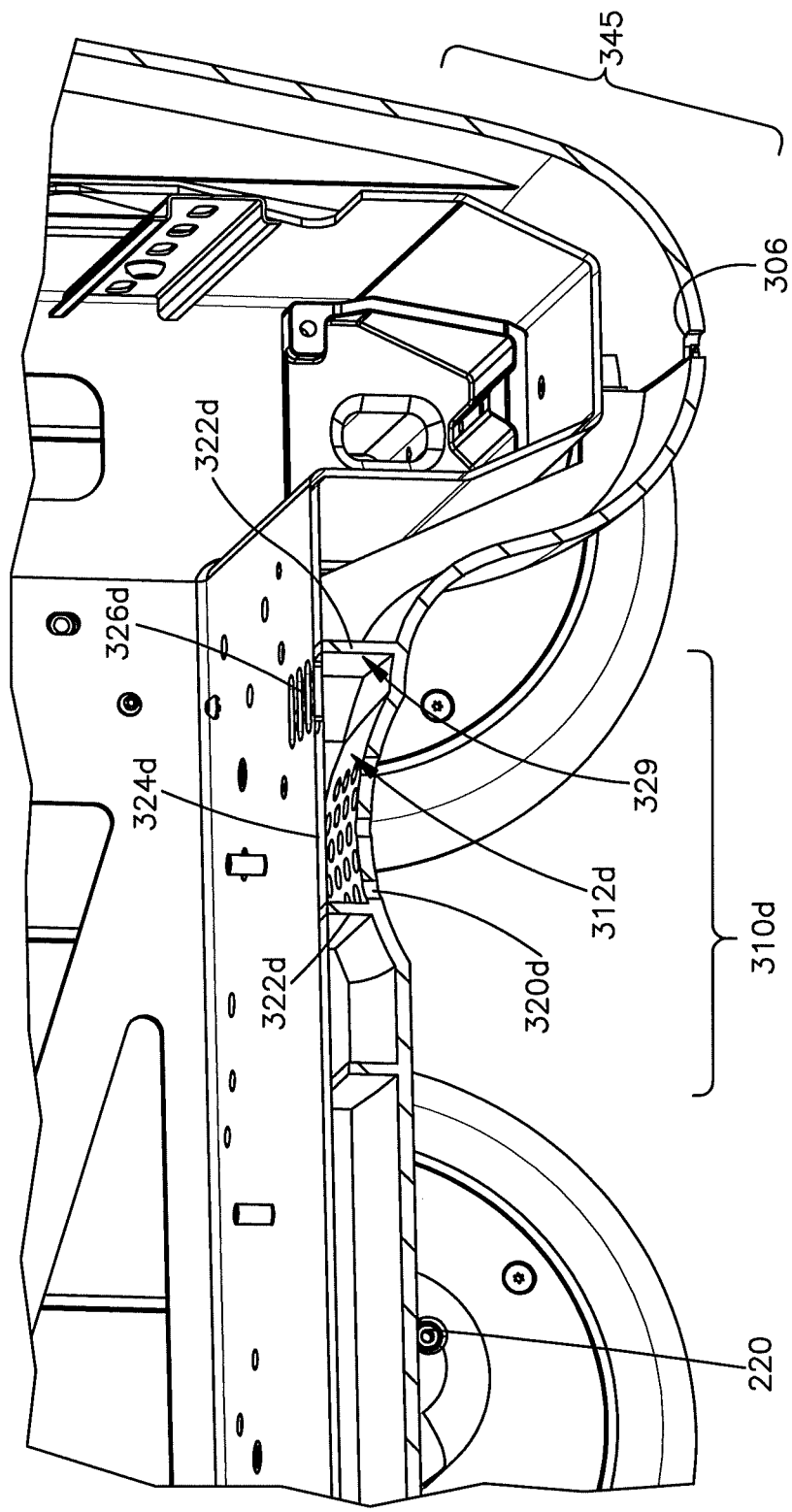

DRAINAGE SYSTEM FOR A DELIVERY AUTONOMOUS GROUND VEHICLE

BACKGROUND

The present invention relates to autonomous ground vehicles, and more particularly to drainage systems, and methods relating to delivery AGVs.

Delivery robots have been proposed and disclosed for delivery of various items to an end-customer or business. A typical delivery robot is moveable under its own power and includes a housing that covers or contains a payload, which can include groceries, take-out food orders, and the like. Delivery robots can, in many circumstances, be exposed to weather, such as rain, which can harm electronic parts and electric motors, in addition to harming the payload.

Delivery AGVs often are propelled by battery powered, motorized wheels to move packages or other items to a home or business. At times, it is expected that the cargo area of a delivery AGVs will be exposed to rain or other precipitation, such as when a customer opens a lid to access the package while exposed to rain. At other times, the delivery AGV will operate in a driving rainstorm and/or drive through puddles and be exposed to other splashing water.

BRIEF DESCRIPTION OF THE DRAWINGS

FIG. 25 is a perspective view of an underside of a portion of the lip of the AGV, illustrating a mount for a lid hold-down device;

FIG. 27A is a perspective view of a drain pan about a hinge mechanism;

FIG. 29 is an enlarged view of a rear, inlet air portion of the structure of FIG. 28; and FIG. 30 is an enlarged view of a front, outlet air portion of the structure of FIG. 28.

DETAILED DESCRIPTION OF ILLUSTRATIVE EMBODIMENTS

Figure 1:
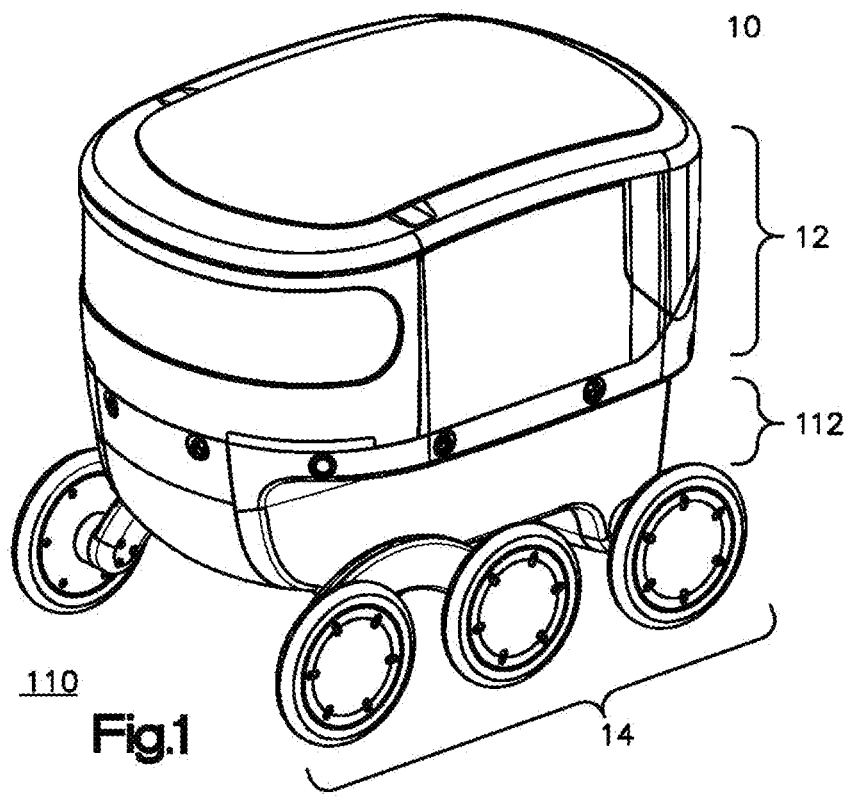
FIG. 1 is a perspective view of a delivery AGV illustrating aspects of the present invention.
Figure 2:
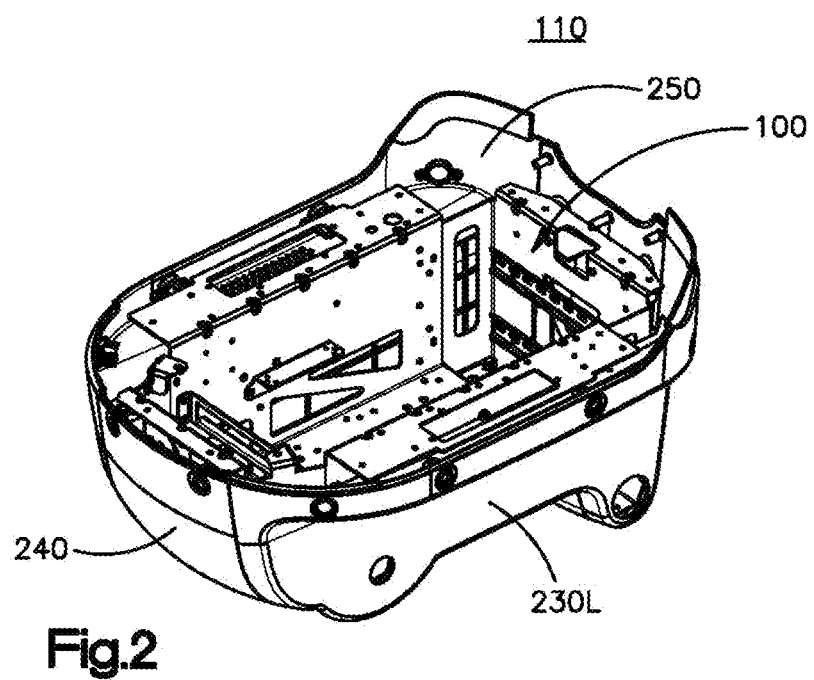
FIG. 2 is a top, front perspective view of a chassis and skin combination of FIG. 1, with its upper portion (including cargo bay and sensor bays) and drive assemblies removed.
Figure 3:
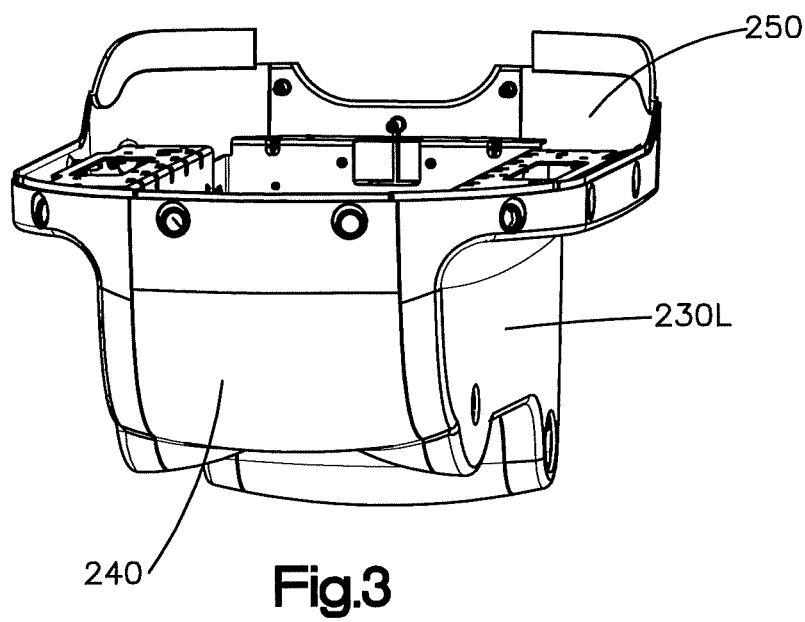
FIG. 3 is another top perspective view of the structure of FIG. 2.
Figure 4:
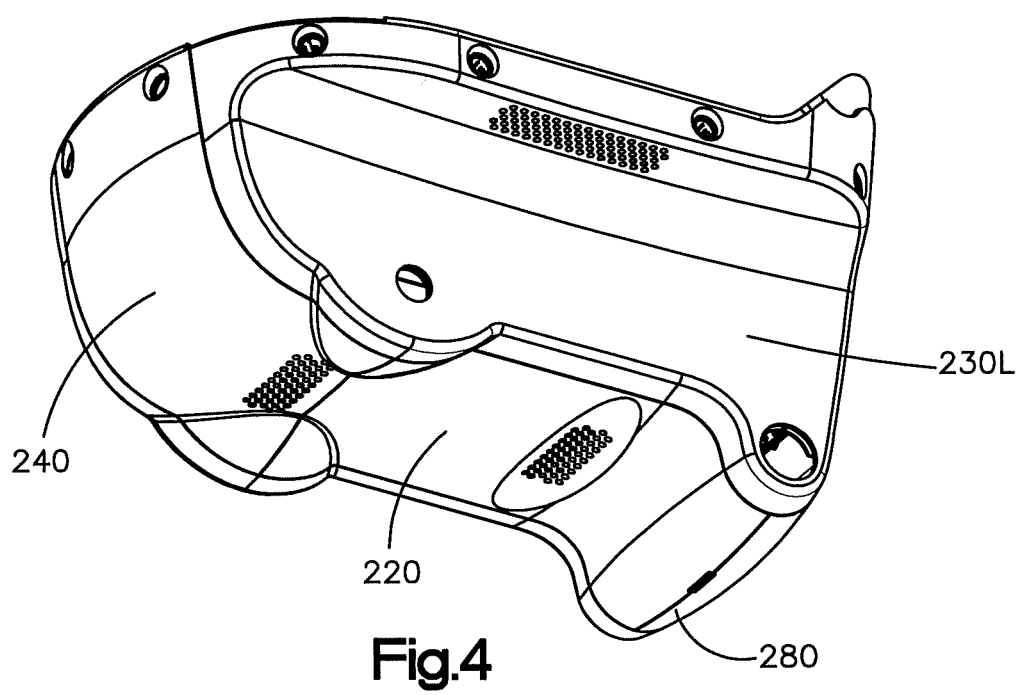
FIG. 4 is a bottom perspective view of the structure of FIG. 2.
Figure 6:
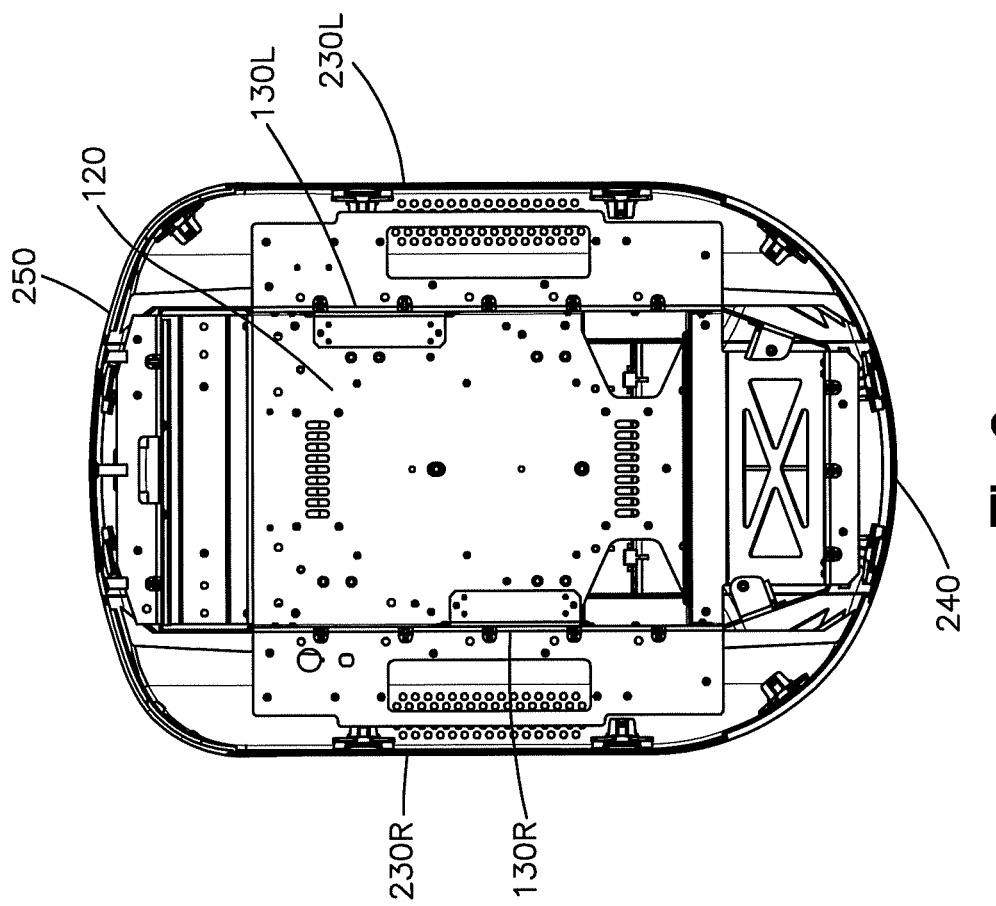
FIG. 6 is a top view of the structure of FIG. 2.
Figure 5:
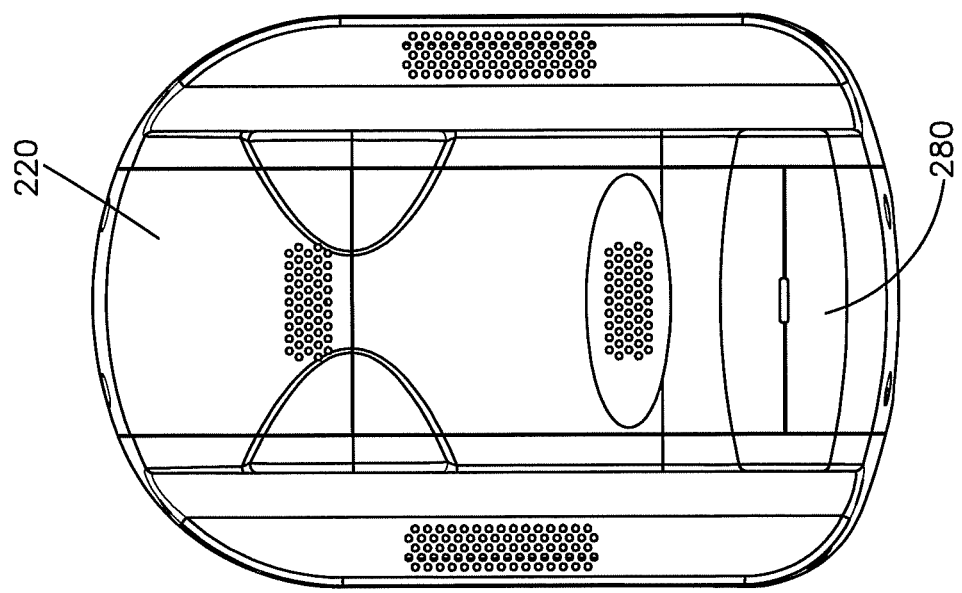
FIG. 5 is bottom view of the structure of FIG. 2.
Figure 8:
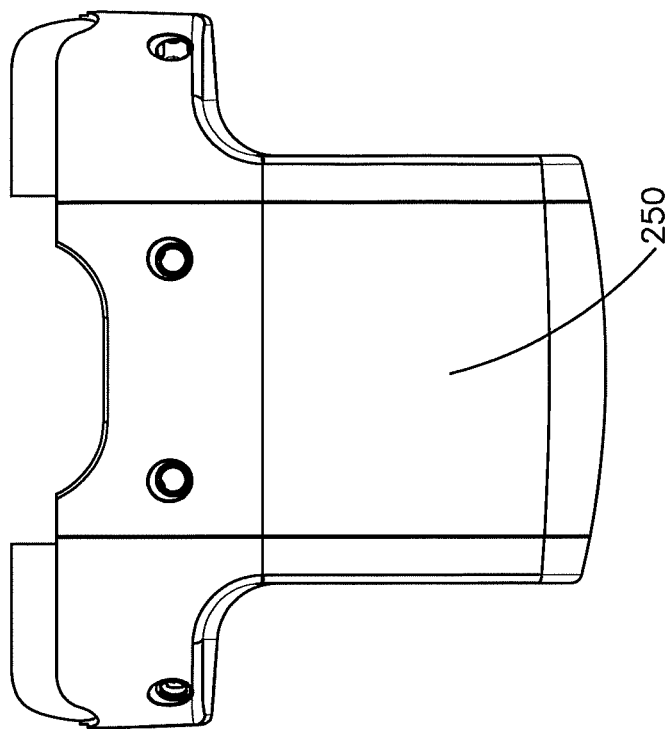
FIG. 8 is a rear view of the structure of FIG. 2.
Figure 7:
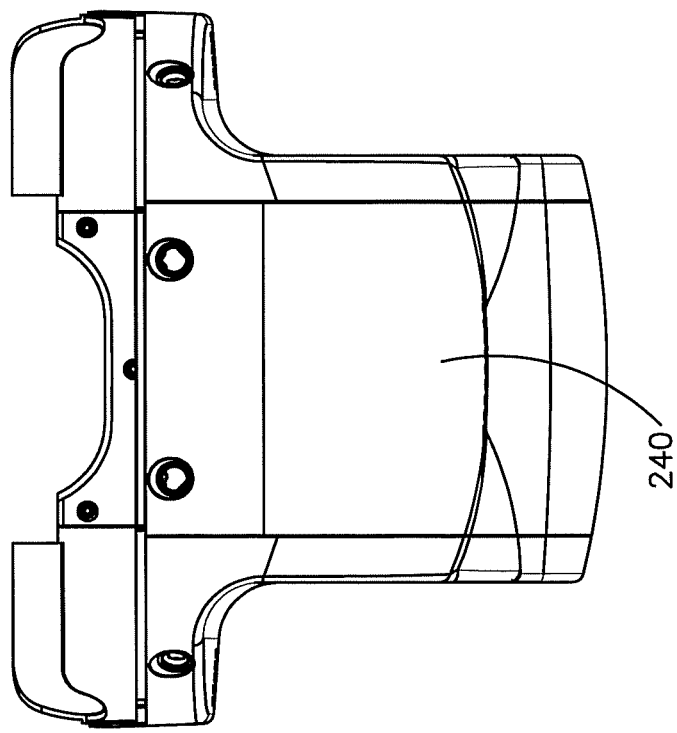
FIG. 7 is a front view of the structure of FIG. 2.
Figure 9:
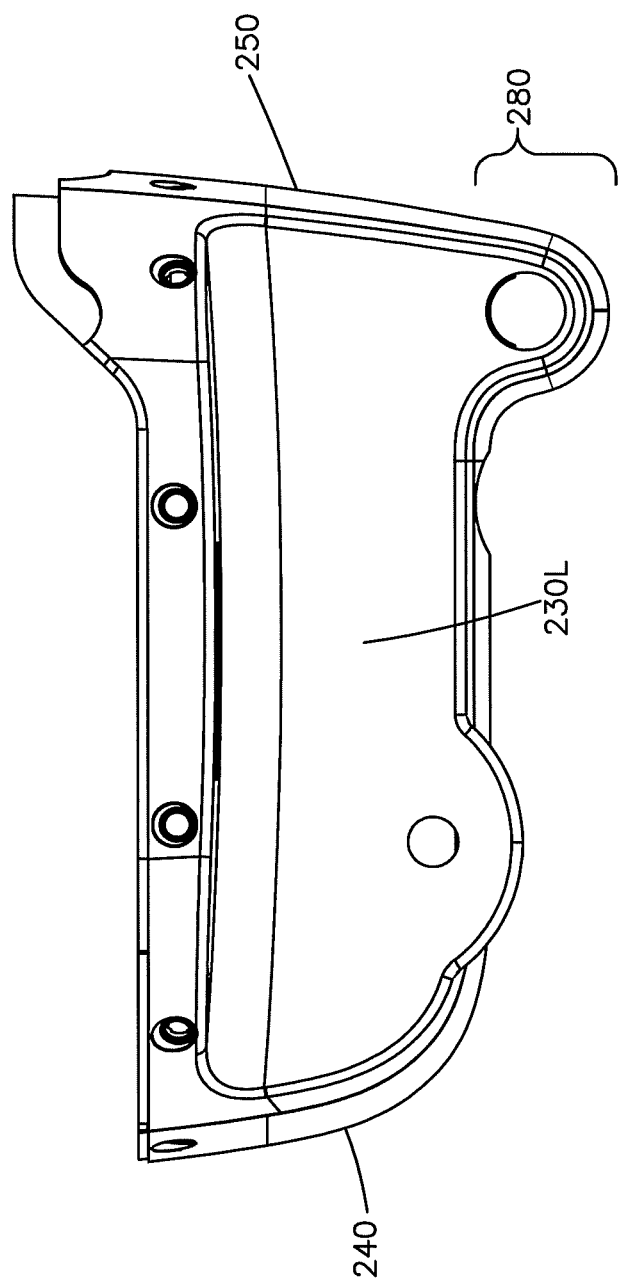
FIG. 9 is a side view of the structure of FIG. 2, with the opposing side being the mirror image of the structure shown in FIG. 9.

An autonomous ground vehicle (AGV) is a category of robot that might operate at times in an unprotected, uncontrolled environment. The term delivery AGV is used for AGVs carrying a payload for delivery purposes. A delivery AGV 10 includes an enclosed cargo compartment inside of an AGV body and a drive system. In the example AGV of the figures, the AGV 10 includes an upper body and a lower body, and other configurations are contemplated.

According to one aspect of the AGV, the lower body can include an aluminum sheet metal chassis and a skin formed of interlocking, overlapping panels that are applied to and cover an outboard surface of the chassis. Fasteners connecting the skin to the chassis are applied from the inside such that the skin has a fastener-free exterior surface; none of the fasteners are visible on an exterior of the skin.

According to another aspect of the delivery AGV, the lower body includes chassis and an exterior skin. The chassis includes (i) an open top that defines a hardware bay, (ii) front wheel assembly interfaces, and (iii) rear wheel assembly interfaces. Either the front wheel assembly interfaces or the rear wheel assembly interfaces is lower than the other. The exterior skin is connected to the chassis and covers the chassis. The skin includes multiple panels, each of which is connected to a corresponding portion of the chassis by fasteners extending from an inboard face of the chassis into corresponding bosses on the inboard surface of the panel. The panels are at least partially mutually overlapping for water ingress resistance.

The term "panel" is used herein to refer to structures of the skin and is not intended to be limited to any particular structure unless the structure is specified in the claim. For example, the panel may be flat or have a flat portion, but may also be curved, or have curved portions, shoulders, covers, and other features and/or shapes. The fasteners can be any type, such as for non-limiting examples, screws, rivets, interference fit pins that extend into bosses in an interference or tight fit, heat stakes or mechanical stakes that extend from the panels through holes in the chassis and are secured by deformation by heating or mechanical force. Preferably, the fasteners are only visible from inside the lower body such that each one of the panels has a fastener-free exterior surface.

The panels can include a bottom panel, a pair of opposing side panels, a front panel, and a rear panel. The bottom panel can include bottom longitudinal lips on outboard sides thereof, and each one of the side panels includes a side longitudinal lip, the bottom longitudinal lips and the side longitudinal lips overlap one another. As used herein, the terms "fore and aft" refer to relative directions or orientations consistent with the term "longitudinal" and with the driving direction of the delivery AGV.

The side panels can include fore and aft lateral lips, the front panel can include front lateral lips, and the rear panel can include rear lateral lips. The fore lateral lips of the side panels and the front lateral lips overlap. The bottom panel can include fore and aft transverse lips, the front panel can include a front transverse lip, and the rear panel can include a rear transverse lip. The fore transverse lip of the bottom panel and the front transverse lip overlap one another, and the aft transverse lip of the bottom panel and the rear transverse lip overlap one another. As used herein, the term "lateral lip" does not require that the lip be located on a side, as the lateral lips may be on a corner or on the ends. In the figures, the lateral lips are substantially vertical, but verticality is not required.

The bottom panel and the front panel form a hinge structure (hook and tab) adapted for holding a lower edge of the front panel to the bottom panel while pivoting the front panel relative to bottom panel during assembly of the lower body. The bottom panel and the rear panel form a hinge structure adapted for holding a lower edge of the rear panel while pivoting the rear panel relative to the bottom panel during assembly of the lower body.

The side panels and the bottom panel form a clip structure adapted for holding the side panel relative to the bottom panel during assembly of the lower body. Thus, the side panels can be installed by translating them directly toward and into the chassis. The clips can hold the sides in place for alignment and fastening.

The chassis can include an integral, transverse frame that defines a lowermost part of the chassis. In the embodiment of the figures, the transverse frame is at the rear of the chassis, and other locations are contemplated. The transverse frame is integral with the chassis in that it is part of, not moveable relative to, the chassis. The frame is part of the chassis structure.

Front wheel interfaces are formed by recesses in the chassis sides, and the interfaces may be reinforces with a plate, stiffeners, and like structure. The rear wheel interfaces of the chassis are formed on the transverse frame, which in the figures is at the rear of the AGV, but as explained above can be other locations.

In the embodiment of the figures, the chassis is formed of aluminum sheet and/or structural shapes. Other materials and configurations are contemplated.

According to another aspect of the delivery AGV, a method of assembling a lower body for a delivery autonomous ground vehicle (AGV) adapted for carrying and delivering a payload can include the steps of: (a) affixing a bottom panel to a bottom portion of a chassis; (b) after the affixing step (a), hooking a lower edge of a front panel onto a portion of the bottom panel and rotating the front panel about the bottom panel until the front panel contacts the chassis, and then affixing the front panel to the chassis; (c) after the affixing step (a), hooking a lower edge of a rear panel onto a portion of the bottom panel and rotating the rear panel about the bottom panel until the rear panel contacts the chassis, and then affixing the rear panel to the chassis; and (d) after the affixing step (a), affixing opposing side panels to the lower body.

The affixing step (a) can include fastening the bottom panel to the chassis via fasteners through holes in the chassis into bosses formed on an inboard face of the bottom panel; the affixing step (b) can include fastening the front panel to the chassis via fasteners through holes in the chassis into bosses formed on an inboard face of the front panel; and the affixing step (c) can include fastening the rear panel to the chassis via fasteners through holes in the chassis into bosses formed on an inboard face of the rear panel. Each one of the affixing steps (b) and (c) can include overlapping lips of some panels relative to other panels. The fastening steps can include one of inserting screws, inserting rivets, inserting pins, and deforming heat stakes.

Referring to the figures, a delivery AGV 10 includes an upper body 12, a lower assembly or lower body 112, and a driving assembly 14. Upper body 12 includes a shell, a cargo bay, front and rear electronics bays behind corresponding front and rear windows in the housing, and a lid assembly.

Lower body 112 includes a chassis 110 and a skin or shell assembly 210. Chassis 110 in the embodiment of the figures is formed of sheet aluminum sheets or plates, including a bottom wall 120, left and right side wall 130L and 130R, a front wall 140, and a wall 150. The walls are affixed together, such as by rivets or other conventional means, to form a structure that is unitary and capable of supporting AGV 10. Chassis 110 has an open top and forms a hardware bay for holding batteries, power component (such as motor controllers, PCBs and the like) and other components as needed. Forward and rearward bays can house sensors and like components.

A rear portion of bottom wall 120 and a bottom portion or rear wall 150 merge into a transverse structure 180, which forms a lowermost portion of chassis 110 and provides structural support for the rear wheel assemblies. Chassis 110 also includes flanges 142 to support portions of the upper assembly 12. The plates also include holes 170 for receiving screws. Openings for alignment features may also be provided.

Figure 10:
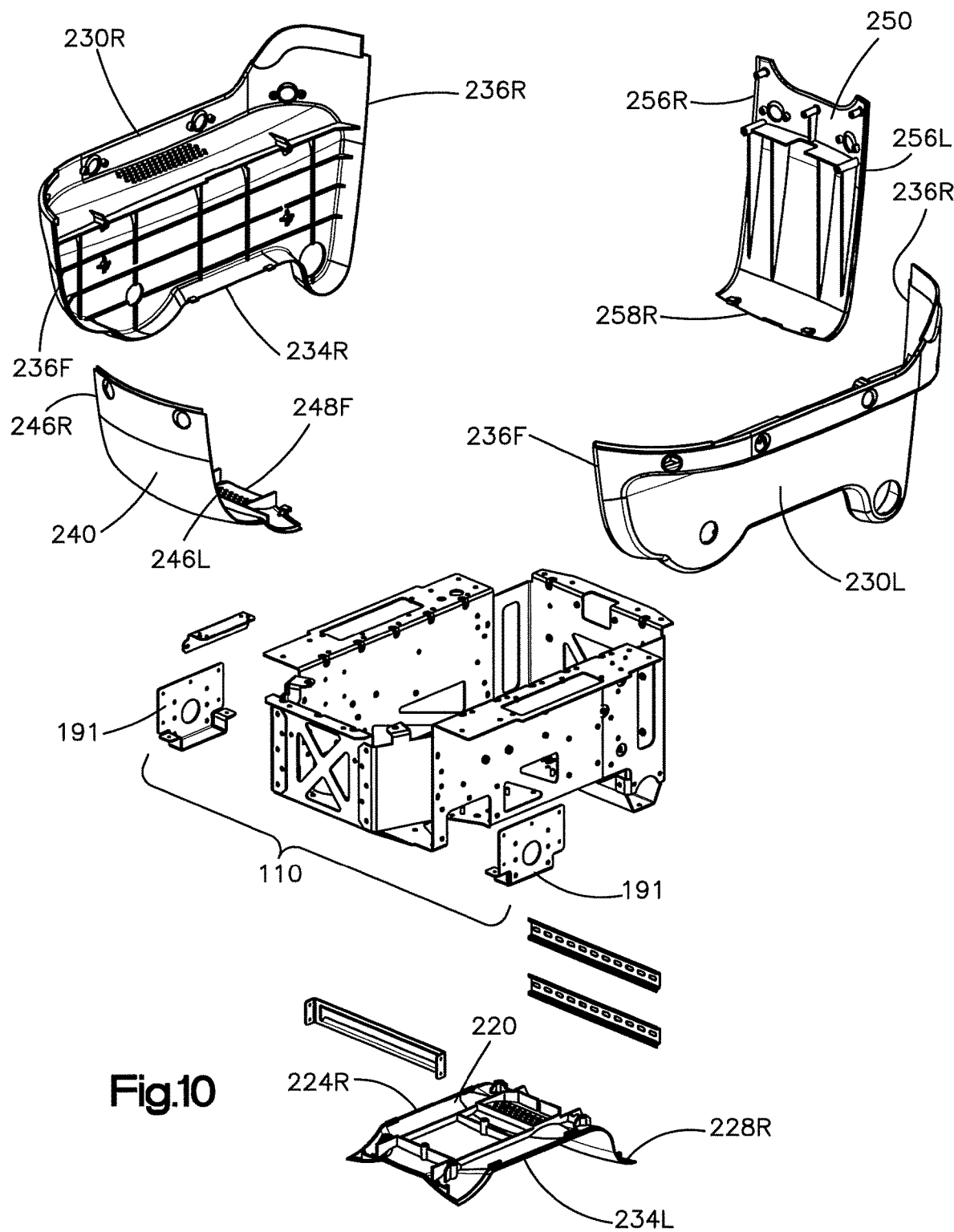
FIG. 10 is an exploded view of the structure of FIG. 2.
Figure 12:
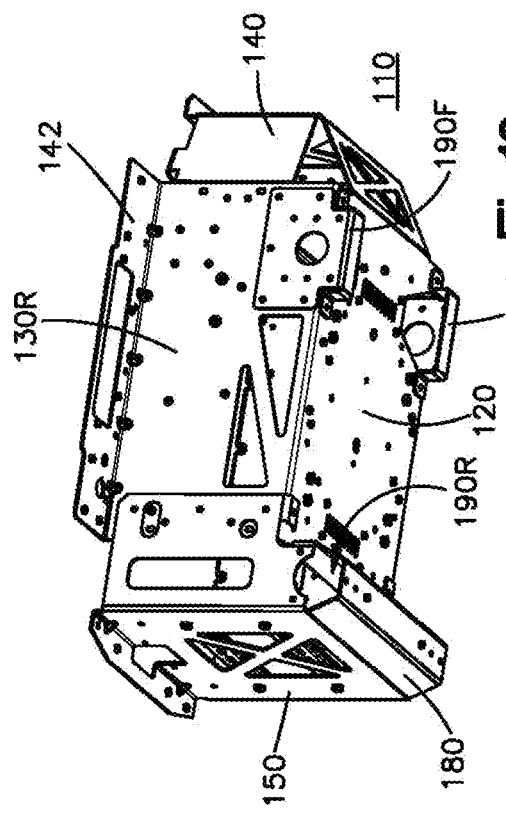
FIG. 12 is a top, rear perspective view of the chassis of FIG. 11.
Figure 11:
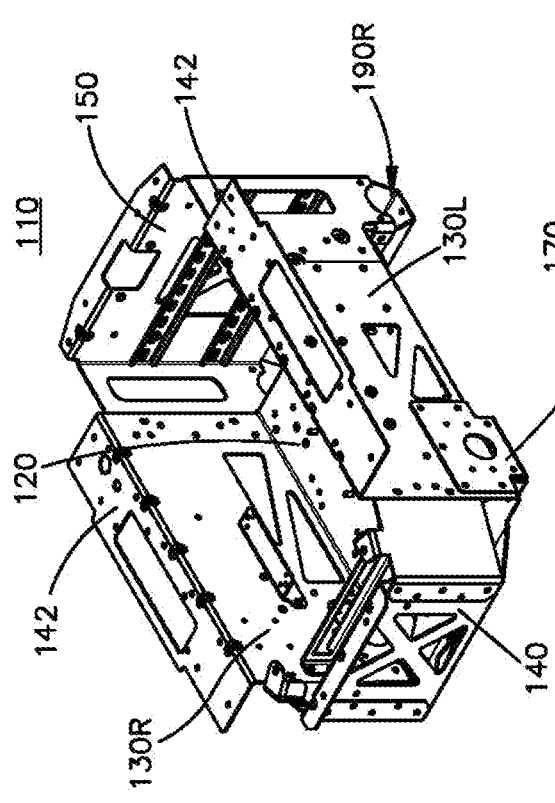
FIG. 11 is a top, front perspective view of the chassis component of the structure of FIG. 2.
Figure 13:
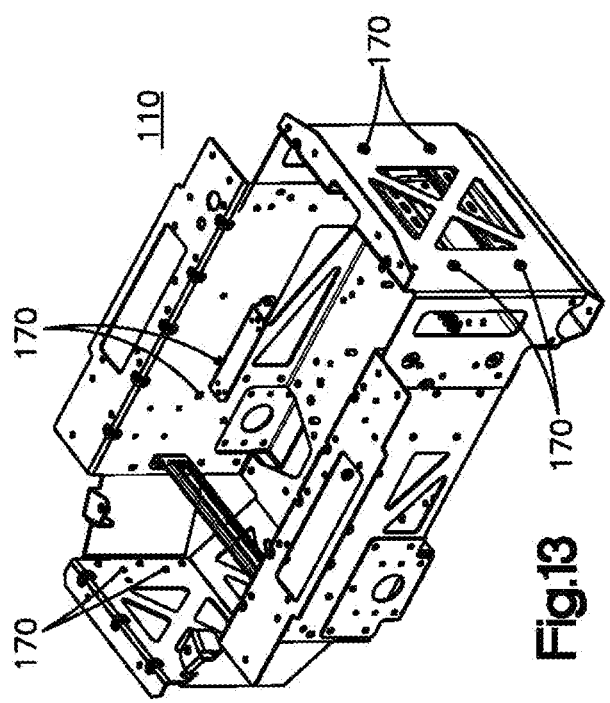
FIG. 13 is a bottom, rear perspective view of the chassis of FIG. 11.
Figure 14:
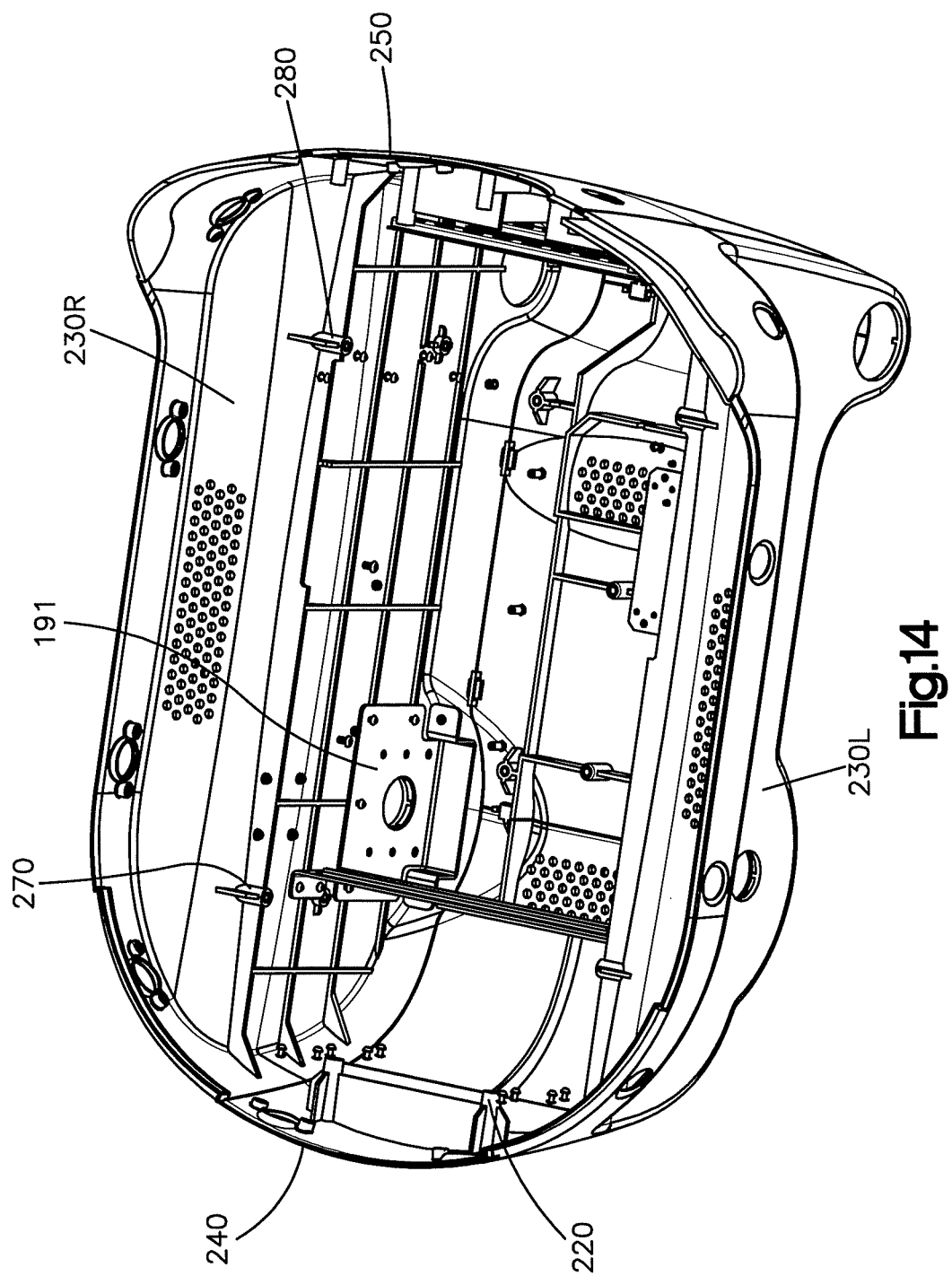
FIG. 14 is a top perspective view of the assembled panels of FIG. 2, with the chassis removed for clarity.
Figure 15:
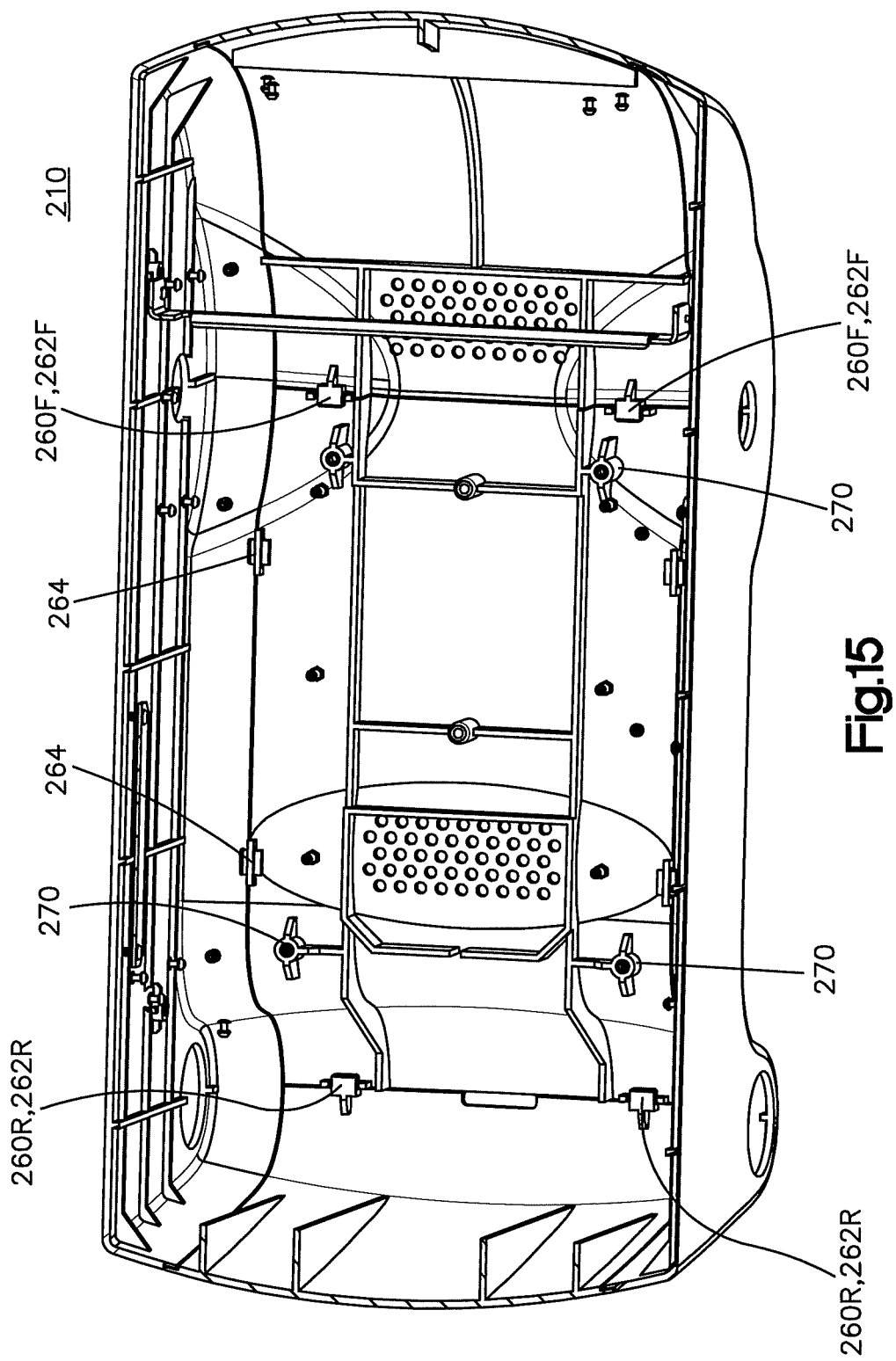
FIG. 15 is another top perspective view of the assembly of FIG. 14 with additional portions removed for clarity.
Figure 16:
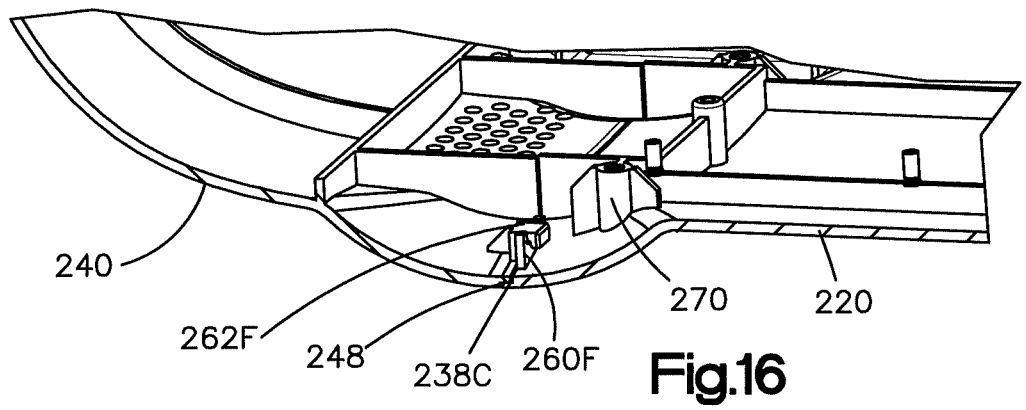
FIG. 16 is an enlarged, cross section portion of the skin of assembly of FIG. 14, illustrating aspects of the bottom and front panels.
Figure 17:
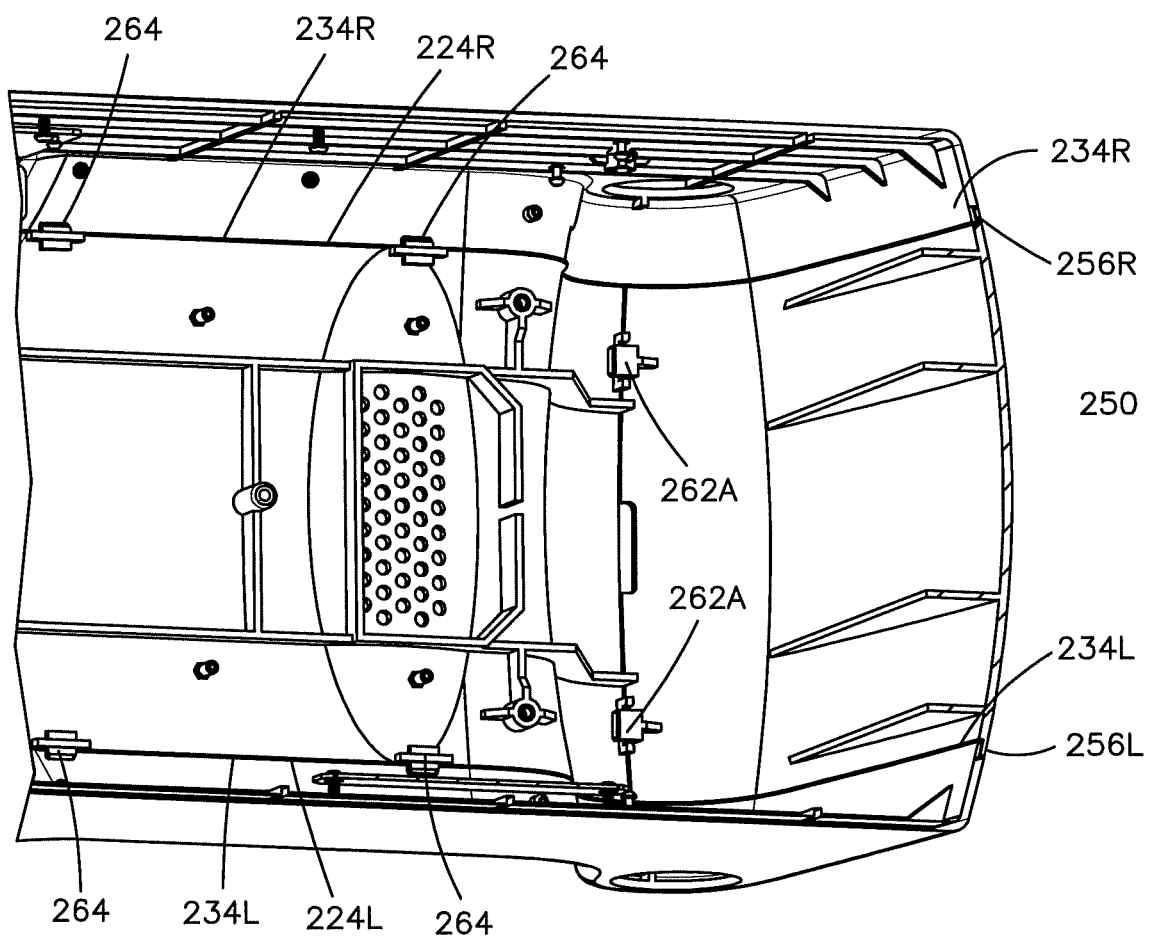
FIG. 17 is an enlarged view of the assembly of FIG. 14 illustrating aspects of the rear, side, and bottom panels (including the barrel form by the bottom panel and the rear panel)
Figure 18:
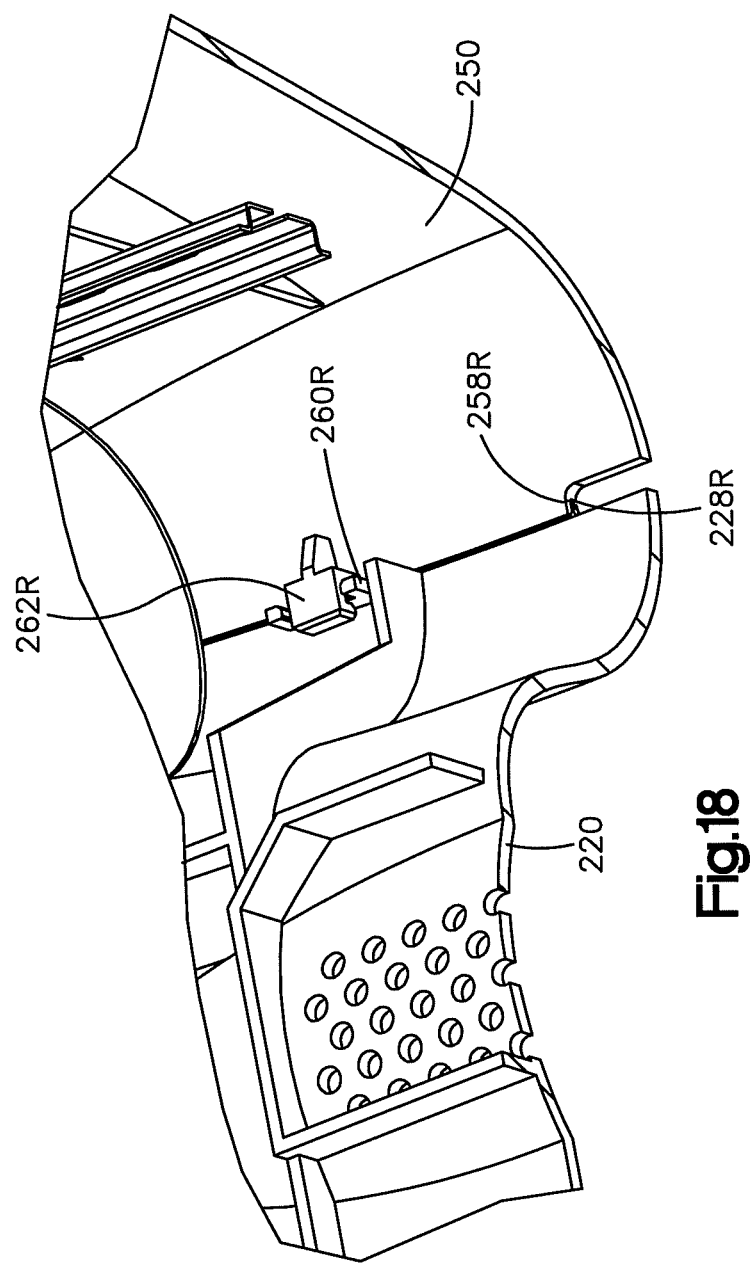
FIG. 18 is an enlarged view of a portion of the structure shown in FIG. 17, including the interface between the bottom panel and rear panel.
Figure 19:
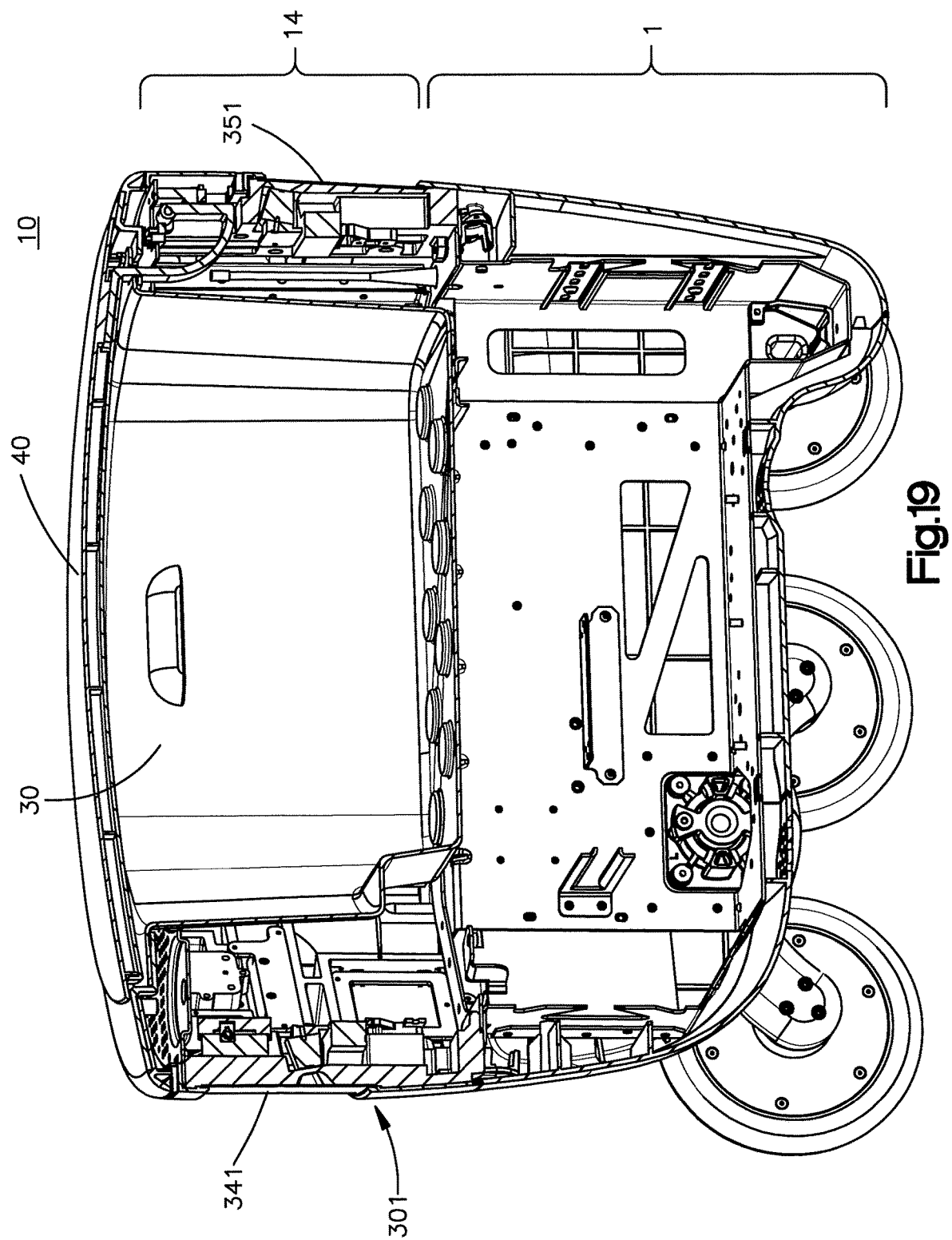
FIG. 19 is a longitudinal cross section of the delivery AGV of FIG. 1.
Figure 20:
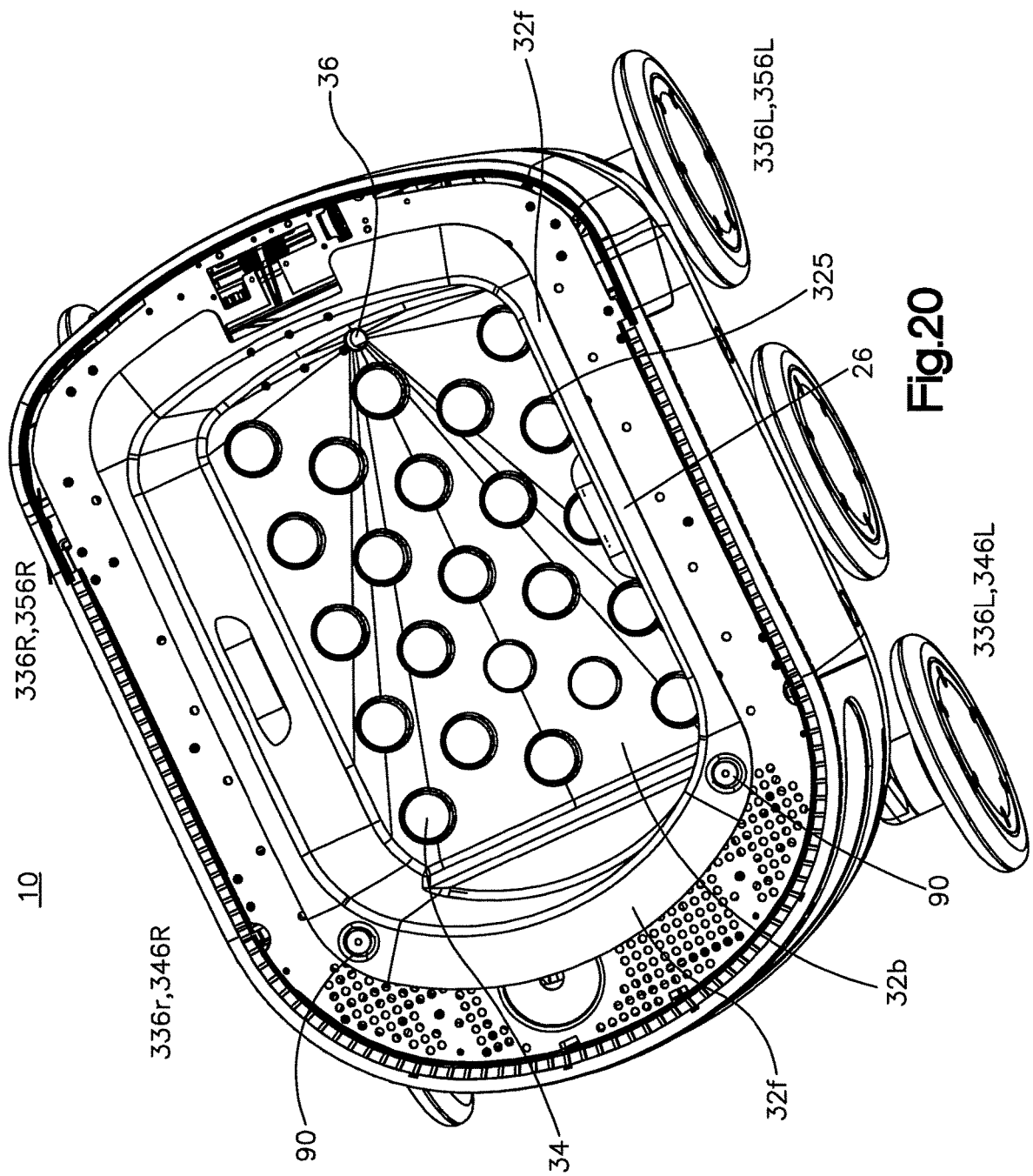
FIG. 20 is top perspective view of the AGV of FIG. 19 with the lid removed.
Figure 21:
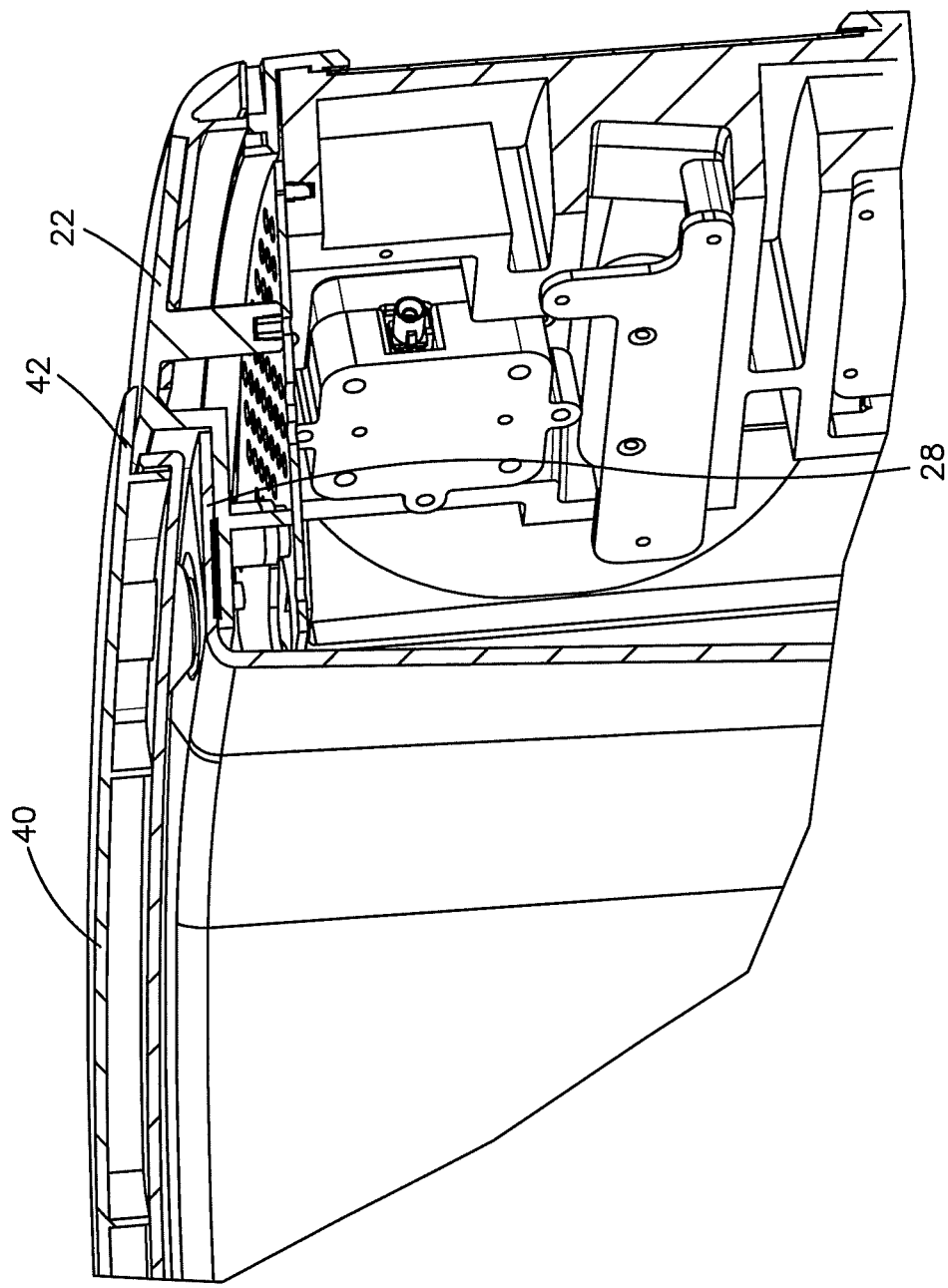
FIG. 21 is an enlarged cross section view of the lid and upper portion of the AGV of FIG. 19.
Figure 24:
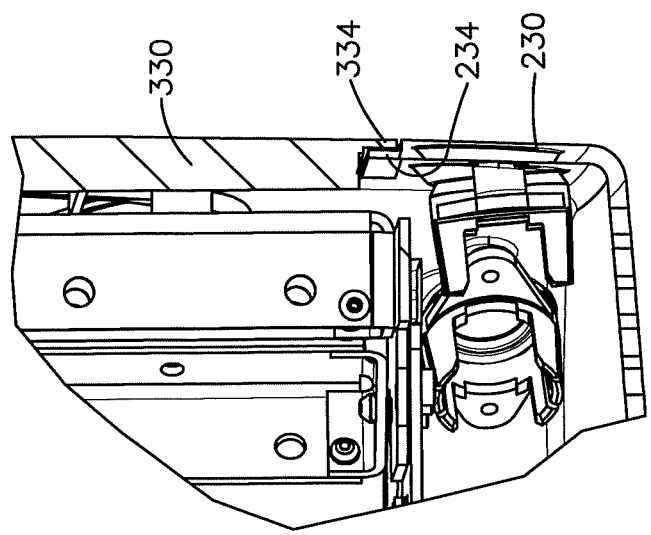
FIG. 24 is an enlarged cross sectional view of a side portion of the AGV of FIG. 19 illustrating panel overlap.
Figure 23:
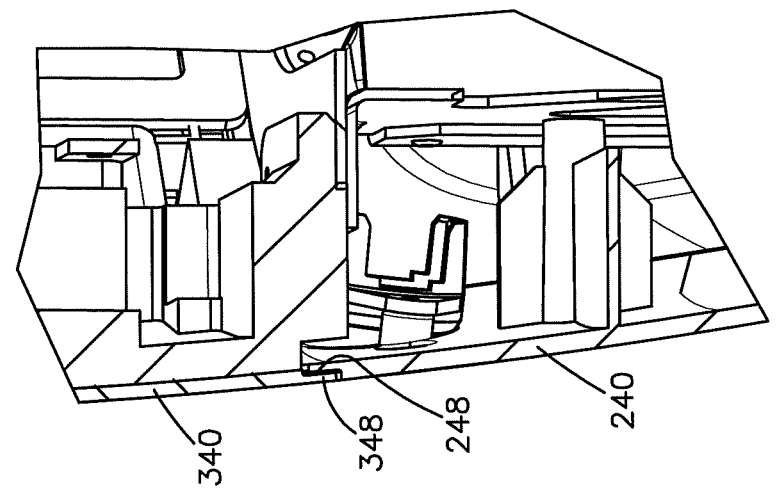
FIG. 23 is an enlarged cross sectional view of a front portion of the AGV of FIG. 19 illustrating panel overlap.
Figure 22:
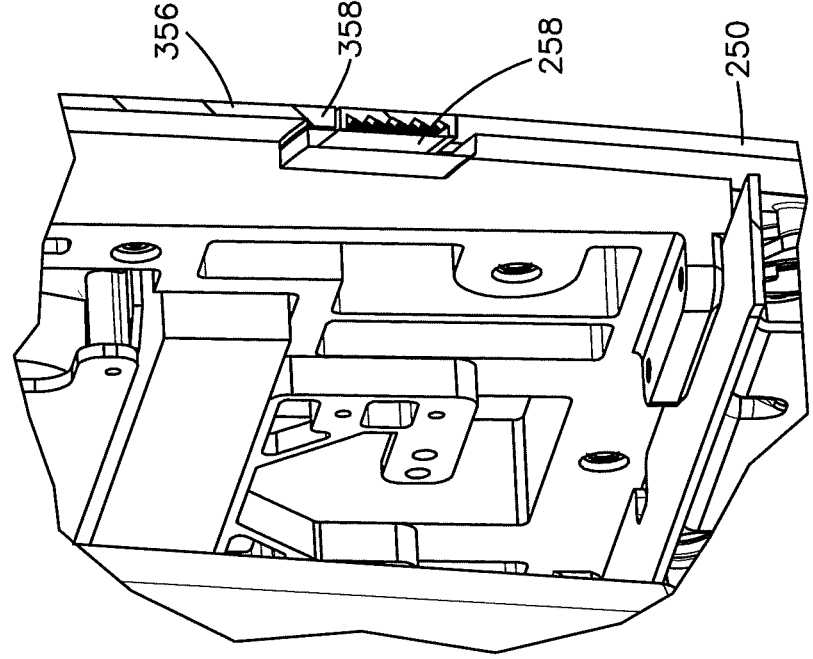
FIG. 22 is an enlarged cross sectional view of a rear portion of the AGV of FIG. 19 illustrating panel overlap.
Figure 26:
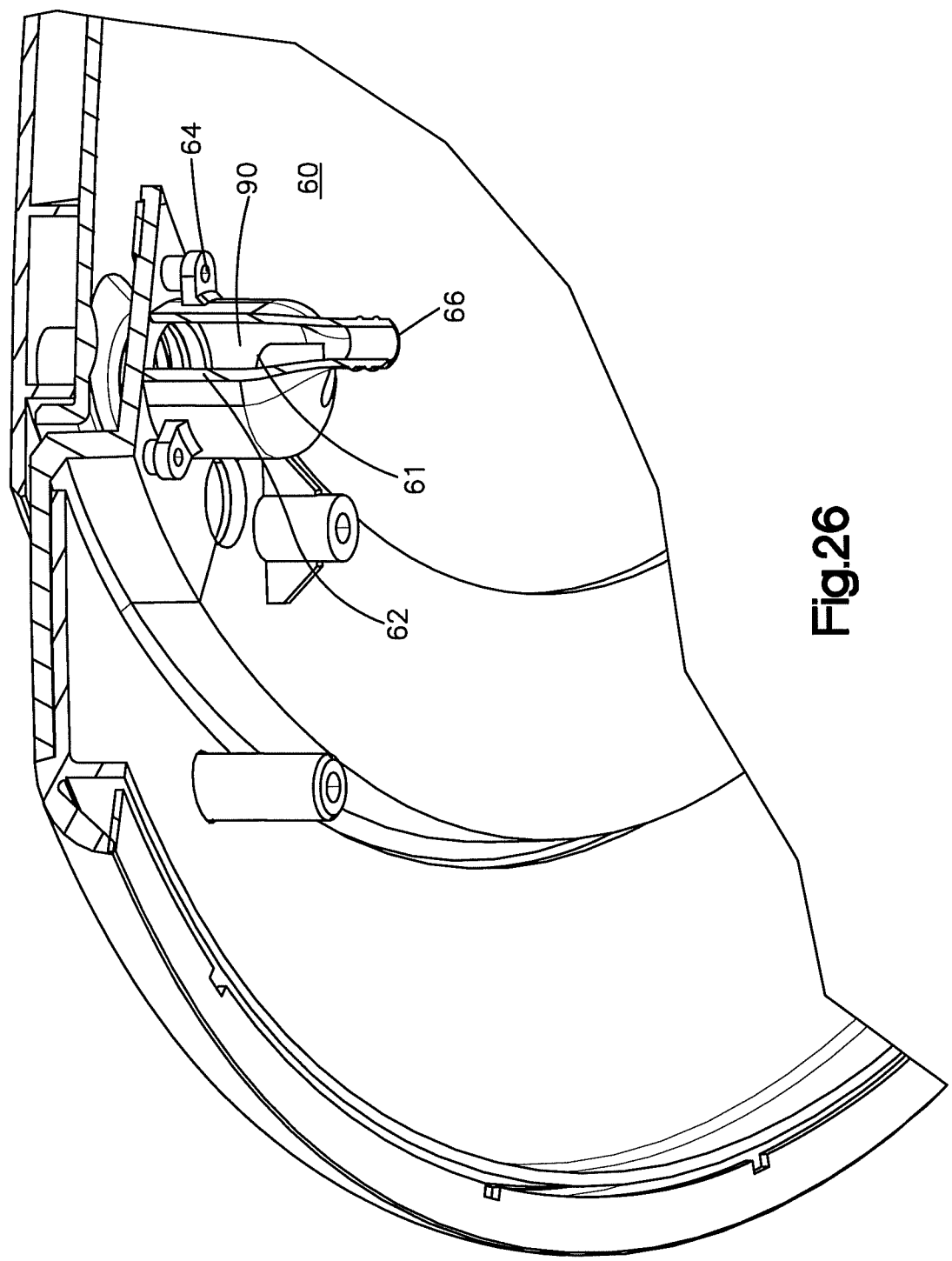
FIG. 26 is a perspective cross sectional view of the hold-down device of FIG. 25.
Figure 27B:
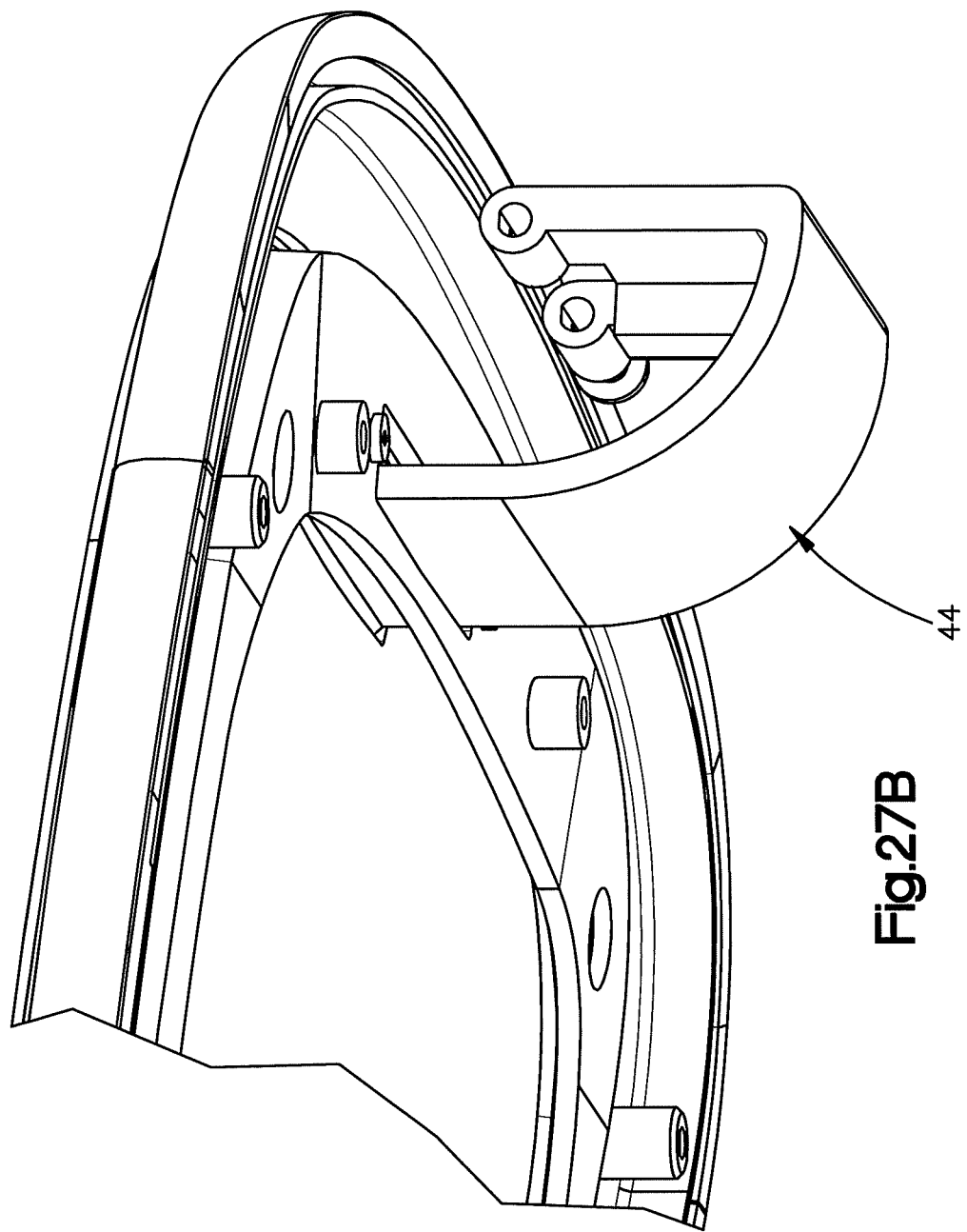
FIG. 27B is a perspective view of the hinge mechanism with other parts removed for clarity.
Figure 28:
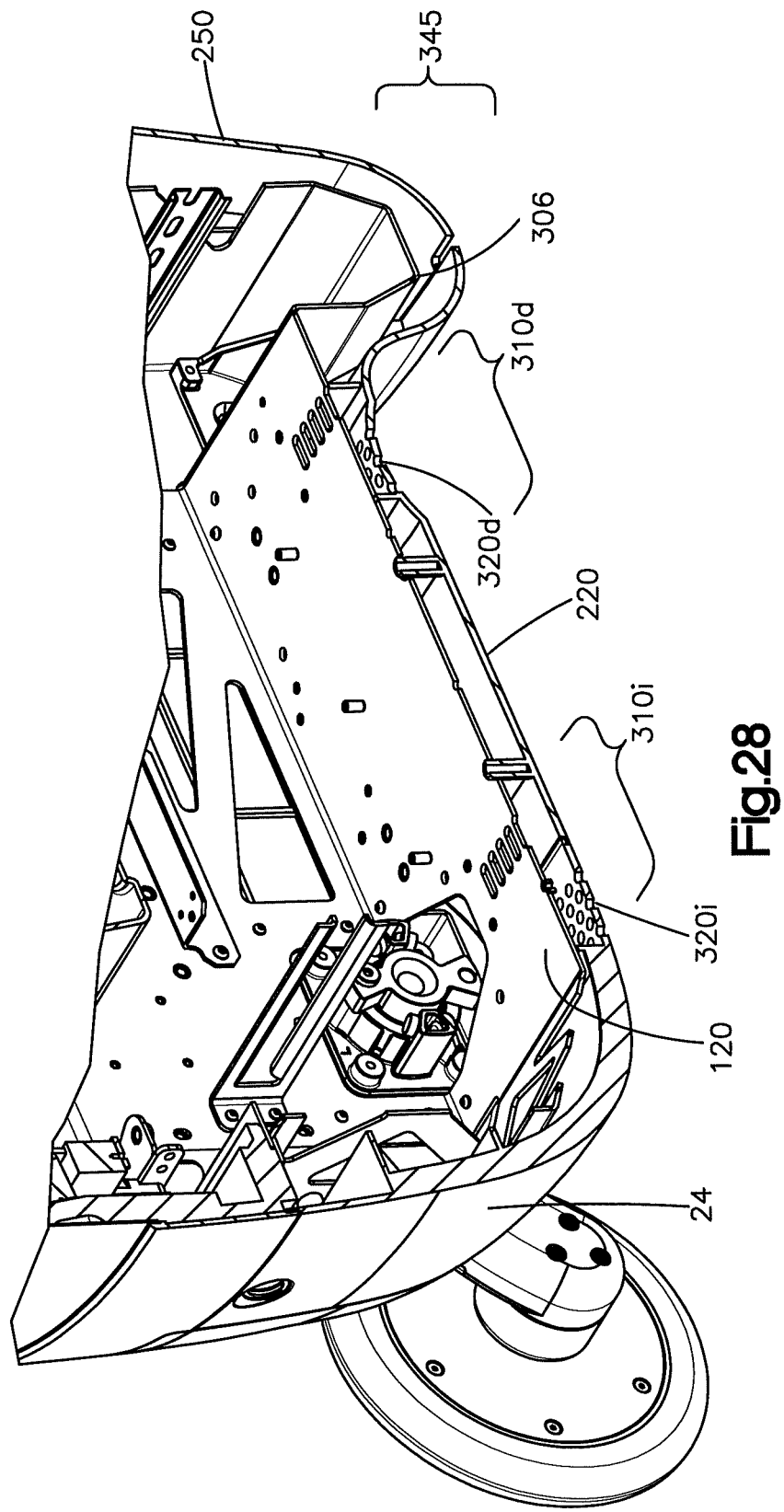
FIG. 28 is a perspective, cross sectional view of a lower portion of the AGV illustrating air inlets and outlets'

Transverse frame 180 includes structure features forming rear wheel assembly interfaces. A forward portion of chassis 110 includes holes or cutouts housing front wheel assemblies. For example, plates 191 that are part of the motor and wheel assembly are illustrated in FIG. 10. FIGS. 11-13 omit plates 191. Other configurations are contemplated. Frame 180 includes ends 190 that receive drive wheel motors or structures to secure drive motors to the chassis.

The walls of the chassis include structural and functional features that depend on the particular application, including a tapered nose (that is, front walls 140 tapers when viewed in top view), various openings, tabs, structural cross-members, and the like. The walls of chassis 110 can be formed of any material suitable for supporting the panels and wheel assemblies as the AGV carries the intended load. Aluminum sheet metal is used in the embodiment of the figures. The thickness, specific material, use of stiffeners and other structural supports, and other decisions relating to the material choice and properties can be made according to the particular goals of the AGV, including strength, weight, and like parameters.

Shell 210 includes a bottom panel 220, left and right side panels 230L and 230R, a front panel 240, and a rear panel 250. Shell 210 encloses chassis 110. Panels 220, 230, 240, and 250 encase chassis 110, and are included with relatively flat portions, curved shoulders, and like features for aesthetic and functional purposes. Side, front, and rear panels 220, 230, and 240 are upright, while bottom panel 220 forms the underside of shell 210.

A rear portion of bottom panel 220 curves downwardly about a forward portion of chassis transverse frame 160. A lower portion of rear panel 250 curves inwardly about a rear portion of chassis transverse frame 190. The rear portion of bottom panel and the lower and forward portion of rear panel 250 form a barrel 245 having a drain 306.

The panels include several features chosen according to the particular parameters of the application, such as openings for ultrasonic sensors, drain holes and air inlets, shoulders and undercuts, provisions for receiving windows for sensor bays, among others. The panels are formed of an appropriate engineering polymer, such as polycarbonate or a polycarbonate and ABS blend, suitable for its intended duty, as will be understood by persons familiar with outdoor use of polymers in low speed vehicles in view of the present disclosure. The overall weight of the components is a factor in the choice of materials.

The panels can have shapes that vary from the shapes and configurations shown depending on the application parameters. The panels preferably include overlapping lips to prevent ingress of water, such as by splashing or driving rain. In addition, seals or gaskets may be provided. The panels are affixed to the chassis via screws through holes 170 in the chassis that mate with bosses 270 extending inwardly from inboard faces of the panels, as illustrated in the figures. Other configurations are contemplated.

In this regard, bottom panel 220 includes bottom longitudinal lips 224L and 224R at left and right longitudinal edges, and includes fore and aft transverse lips 228F and 228R. Each side panel 230L and 230R includes longitudinal lips 234L and 234R that mate with or overlap with corresponding bottom longitudinal lips 224L and 224R of bottom panel 220. Each side panel also includes fore and aft lateral lips 236F and 236R.

Front panel 240 includes a front transverse lip 248 that mates with or overlaps with the front transverse lip 228F of bottom panel 220. Front panel also includes left and right lateral lips 246L and 246R that overlap with or mate with corresponding side transverse lips 236L and 236R.

Rear panel 250 includes a rear transverse lip 258 that mates with or overlaps with the rear transverse lip 228R of bottom panel 220. Rear panel 250 also includes left and right lateral lips 256L and 256R that overlap with or mate with corresponding side transverse lips 236L and 236R.

Features for holding the panels in place, either temporarily during installation, include clips and hooks, as explain with a method of assembling the panels to the chassis. A complete, structural chassis 110 is first fitted with bottom panel 220 by fastening the two parts together.

Next, hooks 262F that extend downwardly from a lower edge of front panel 240 (preferably two hooks) are inserted over corresponding tabs 260F at or near a front edge of bottom panel 220. Hooks 262 and tabs 260 are on the inboard faces of the panels. As illustrated in the figures, tabs 260 can be open on top to ease receiving the corresponding hooks. Other configuration of hooks and tabs form a hinge are contemplated.

After engaging the hooks with the tabs, the front panel 240 is pivoted relative to bottom panel 220 until it contacts the face of front plate 140 of the chassis. Front panel 240 is affixed to plate 140 by any means, such as fasteners described herein.

Hooks 262R that extend downwardly from a lower edge of rear panel 250 (preferably two hooks) are inserted over corresponding tabs 260R at or near a rear edge of bottom panel 220. After engaging the hooks with the tabs, the rear panel 250 is pivoted relative to bottom panel 220 until it contacts the face of rear wall 150 of the chassis. Rear panel 250 is affixed to chassis rear wall 150 by any means, such as fasteners described herein.

Then the two opposing side panels 230L and 230R can be translated inwardly, with the lips of the panels overlapping the lips of the bottom panel 220 and front and rear panels 240 and 250. Other overlapping configurations are contemplated.

AGV 10 can also include features that form a drainage system. In this regard, water can enter the interior of AGV 10 when the lid of the robot is open. In some circumstances, water can also infiltrate around the lid, be splashed or driven by wind between the panels, and/or be splashed or driven by wind into a cooling air inlet or discharge. The water ingress can harm the package to be delivered and/or damage electronic components. In this regard, the term "drainage" refers broadly to removing water from the interior of the AGV. Features for inhibiting water ingress into the interior of the AGV are also provided.

The AGV includes a lower body and an upper body. The lower body includes a chassis, overlapping exterior panels attached to the chassis, a cooling air path, and a drain outlet at a low point. The upper body includes a cargo bay that has an open top, a sloped bottom panel that includes raised dimples and a cargo bay drain outlet at a low point of the bottom panel.

The cooling air path can:
(i) be formed by ribs on a bottom panel and portions of the chassis,
(ii) communicate cooling air with heat-generating components of the AGV,
(iii) include an air intake path including an air inlet bend; and
(iv) includes an air discharge path including an outlet bend. The bends inhibit water ingress above the bend to shield components within the AGV body from water contact.

According to another aspect of the drainage system and water ingress system of a delivery AGV, the lower body includes a chassis, overlapping exterior panels attached to the chassis, and a main drain outlet at a low point thereof. The upper body includes a cargo bay that has an open top, a sloped bottom wall that includes raised dimples, and a cargo bay drain outlet at a low point of the bottom panel. The dimples can take any form such that projections above a bottom surface to elevate a package or like item above the bottom surface. The cargo bay drain outlet drains to the main drain outlet. The lid can have a closed position in which the lid covers the cargo bay and an open position in which the cargo bay is accessible.

A hold-down assembly can have a body and a mount. The hold-down assembly can be located at an opening in the cargo bay flange such that the hold down assembly body is adapted for releasably securing the lid in the closed position. The mount can:
(i) connect the hold down assembly body to the cargo bay flange;
(ii) enclose an underside of the opening; and
(iii) include a drain outlet,
whereby water entering the cargo bay flange opening about the hold-down assembly body is captured by the mount and guided to the hold-down assembly drain outlet. In this regard, the term "connecting" broadly refers to both direct contact and coupling with an intermediate article between the connected articles.

The hold down assembly can be magnetic or other types, such as a releasable latch (not shown in the figures), which can be of any conventional structure and function. The hold down assembly drain outlet is connected to the AGV main drain outlet.

The delivery AGV can optionally include a seal between the underside of a periphery of the lid and a peripheral flange of the cargo bay. The AGV can also include an actuated hinge for lifting the lid relative to the cargo bay, and a hinge drain pan located below the hinge and adapted to catch water infiltrating around the hinge components. The hinge drain pan can have a drain pan outlet that is connected to the AGV main drain outlet. Further, the lid includes a peripheral lip that extends over an edge of the body that is sloped away from the cargo bay in order to shed water.

According to another aspect of the delivery AGV drain system, drainage features include aspects of an air intake system, either in combination with the features listed above or by itself. An air intake opening (for example, holes) is formed in a bottom one of the panels and receives ambient cooling air. Preferably, the air intake is proximate the front of the AGV and is bottom facing. The lower body also includes air intake walls that, together with an underside of the bottom wall of the chassis, form the inlet air path. The air intake path includes an upward bend having an outlet that is offset from the air intake, thereby inhibiting water ingress above the bend to shield components within the chassis from water contact. The phrase "offset" generally refers to not being aligned, and also encompasses a baffle (not shown in the figures) between the inlet and outlet to perform the same function. The air intake walls can be formed by ribs of a bottom one of the panels and by a portion of the chassis. The chassis can have an opening at the bend.

Further, the delivery AGV can have an air outlet opening (for example, a matrix or arrays of through holes) formed in the bottom panel and adapted for discharging cooling air after contact with heat-generating components of the delivery AGV. The lower body includes outlet air path walls forming an outlet air path that includes a bend, which is offset from the air outlet opening to inhibit water ingress above the bend, in this way shielding components within the AGV body from water contact. The air outlet path is in the rear of the lower body, or otherwise near the main drain.

In this regard, components of the AGV, such as motor controllers and other electronic components, give off heat during operation and benefit from cooling air. The outlet air path walls that handle the cooling air may be formed by ribs of the bottom panel and an underside of the bottom wall of the chassis. The bottom panel forms a portion of a floor of the outlet air path that is sloped toward the main drain. The chassis has an opening at the outlet air path bend. Water not exiting via the main drain can exit via the air intake holes or the air discharge holes.

Referring to FIG. 1 and FIGS. 19-30, AGV 10 includes an upper body 12 that is carried by a lower body 100. Upper body 12 (in the embodiment of the figures) includes a skin or shell 301, a cargo bay 30, and lid 40. Upper body 12 also includes forward and rear looking sensors and other components, which are not shown in FIGS. 19-30 for clarity, behind front and rear windows 341 and 351.

Shell 301 defines a portion of the exterior of the AGV, and includes a pair of opposing, overlapping side panels 330L and 330R, a front panel 340, and a rear panel 350. Together panels 330, 340, and 350 wrap the AGV, and may be formed of an appropriate engineered polymer, such as a polycarbonate or polycarbonate ABS blend, as will be understood by persons familiar with outdoor, low speed vehicles. Preferably, panels 330, 340, and 350 are fastened to vertical columns that extend upwardly from chassis 110. The panels 330, 340, and 350 can include bosses 180 on their inboard surfaces (as described above, not shown in FIGS. 19-30) such that fasteners extend through the vertical columns and into the bosses 180.

Each side panel 330L and 330R includes a longitudinal lip 334L and 334R on its lower edge that overlaps corresponding upper longitudinal lips 234Lu and 234Ru of lower side panel 230.

Front panel 340 includes a transverse lip 348 on its lower edge that overlaps a transverse lip 248u on the upper edge of lower front panel 240. Front panel 340 also includes forward-looking window 341 that is sealed by a gasket about window 341. The gasket and window 341 is supported by and/or sealed to an upper edge of lower front panel 240. For this reason, the portion of front panel 240 that engages the gasket and window 351 preferably includes features to engage the gasket, which can be of any type and are well known.

Rear panel 350 includes a transverse lip 358 on its lower edge that overlaps a transverse lip 258u on the upper edge of lower rear panel 250. Rear panel 350 also includes rearward-looking window 351 that is sealed by a gasket about window 351. The gasket and window 351 are supported by and/or sealed to an upper edge of lower rear panel 250. For this reason, the portion of rear panel 250 that engages the gasket and window 351 preferably includes features to engage the gasket, which can be of any type.

Side panels 330L and 330R also include lateral lips 336L and 336R on their fore and aft edges. Front panel 340 includes left and right lateral lips 346L and 346R that engage in an overlapping relationship with the corresponding front lateral lips 336L and 336R of the side panels. Rear panel 350 includes left and right lateral lips 356L and 356R that engage in an overlapping relationship with the corresponding rear lateral lips 336L and 336R of the side panels.

In this regard, windows 341 and 351 are sealed with gaskets to prevent water ingress at the location of the electronic navigation sensors and other electronic components behind the windows. In the embodiment shown in the figures, the overlapping lips of the lower panels 220, 230, 240, and 250 and the overlapping lips of the upper panels 330, 340, and 350 (that is, the lips between all the panels) can be without gasket or additional seal. The overlapping longitudinal, transverse, and lateral lips inhibit water ingress, but will be imperfect. For example, rain driven sideways by wind in the right orientation can find a path around the overlapping lateral lips 236, 246, 256, 336, 346, and 356. Water can also find its way through longitudinal lips 234, 244, 254, 334, 344, and 354, as well as overlapping transverse lips 246, 256, 346, and 356. Water ingress through overlapping lips is exacerbated by wind and splashing, as well as imperfect contact between the overlapping lips due to tolerances of the polymer panels, thermal expansion and contraction of the panels, shrinkage and deformation of the panels over time, and other possible parameters.

As AGV 10 (optionally) foregoes sealing between the panels, AGV 10 copes with water ingress through shells 210 and 301 by letting the water flow or drip down inboard surfaces of the panels to a lowermost point on the AGV at barrel 245, at which drain 306 is located.

Within AGV 10, beneath lid 40, cargo bay 30 holds packages or other payload. Cargo bay 30 includes a bottom 32b, sidewalls 32s, and a flange 32f that extends outwardly from a periphery of the tops of sidewalls 32s. Cargo bay 30 is approximately cuboid chamber with an open top. Flange 32f can be supported by any portion upper body 12. For example, a landing 26 provides a surface for the underside of flange 32f to rest. A gasket 28 between landing 26 and flange 32f inhibits water from leaking through the gap between the flange and the landing.

When lid 40 is in the open position, water can enter into cargo bay 30, which can harm the package or other payload within lid 40. Dimples 34 are formed in the bottom surface 32b of the cargo bay. The dimples are raised (that is, in relief or embossed) relative to the rest of the surface of 32b, which raised dimples can elevate a package from the water on the surface 32b to eliminate or minimize contact with water. Dimples 34 may be formed of a variety of shapes, including curved and flat surfaces. Further, bottom surface 32b is sloped downwardly to a lowermost point of the cargo bay to a cargo bay drain 36. A tube or hose (not shown) is attached to cargo bay drain 36 and extends to or near main drain 306 to transport water from the cargo bay to the drain.

AGV 10 can also include a hold-down mechanism, such as electromagnets 90, that help retain lid 40 is its down and secure position. Electromagnets 90 illustrate a hold-down mechanism, and the present invention encompasses other hold-down mechanism, such as any structure that requires a water ingress solution, such as a releasable latch or like mechanism.

Electromagnet 90 protrudes through a hole in flange 32f, and thus can create a place for water ingress between the edge of the hole and electromagnet 90, and into the interior of AGV 10. Hold-down mount 60 for catching water ingress at the electromagnet 90 includes a landing 61, an enclosed body 62, flanges 64, and a drain 66.

Electromagnet 90 is supported by landing 61, which is a platform or floor within body 62. Body 62 is affixed to the underside of the landing 26 or other structure of upper body 12 by any fasteners or other means. All of the interior of body 62 slopes to a lowermost point of the mount, where drain 66 is located. A tube or hose (not shown) is attached to mount drain 66 and extends to or near main drain 306 to transport water from the cargo bay to the drain.

As illustrated in FIGS. 1, 19, 21, and 27B, lid 40 slopes downwardly towards is periphery 42. A lip of periphery 42 of the lid engages a downwardly sloping top cover 22 of AGV 10, which tends to shed water from the lid. Lid 40 includes a D-hinge assembly 44 that includes an actuator for opening and (optionally) closing the lid. In some embodiments, hinge assembly 44 protrudes through cover 22 (as it is a moving component) and 32 does not have a seal fully around hinge assembly 44.

As best illustrated in FIGS. 4-5 and 28-30, a cooling air path 310 also handles water ingress. Air path 310 includes an inlet air path 310i and a discharge air path 310d. In this regard, cooling air is drawn into the bottom of the lower body at a set of front inlet holes 320i and discharged after exchanging heat with heat-generating components, such as motor controllers, within the lower body via rear outlet holes 320d. Inlets and outlets 320i and 320d are formed in bottom panel 220. The cooling air inlet and outlet are formed respectively at the front and rear in the embodiment shown in the figures. Other orientations and configurations are contemplated.

Above air inlet 320i, ribs 322i on an inboard side of panel 220 form longitudinal and side walls of air path 310i. An underside surface 324i of chassis bottom wall 120 forms an upper wall or boundary of the air path. An opening 326i in the chassis bottom wall 120 receives air flowing though air path 310i. Opening 326i is offset (that is, vertically not aligned) with air inlet 320i, thereby forming a bend 312i.

Above air outlet 320d, ribs 322d on an inboard side of panel 220 form longitudinal and side walls of air path 310d. An underside surface 324d of chassis bottom wall 120 forms an upper wall or boundary of the air path 310d. An opening 326d in the chassis bottom wall 120 permits air to enter into air path 310d. Opening 326d is offset (that is, vertically not aligned) with air outlet 320d, thereby forming a bend 312d. Bends 312i and 312d inhibit water from entering lower body 100 above the openings 326i and 326d in chassis wall 120, as even splashed water does not have a straight path through the openings.

Air outlet discharge path 310d is near main drain 306. A portion of air discharge openings 320d are on a downward sloping portion of bottom panel 220. Thus, an aperture 329 is formed on the rearmost wall 322d to permit water trapped in air discharge path 310d to flow down the interior of barrel 245 to main drain 306.

To illustrate a use and control system of AGV 10 to put the chassis and skin combination in context, a power system (not shown) can be housed in chassis and can include a power supply, such as conventional rechargeable batteries, and an electric motor to provide power to the wheels. The control system may power both the left and right motors at equal speed to propel AGV 10 in a straight line, may power one motor at a higher speed to turn AGV as needed, and may power the drive wheels in opposing directions to rotate AGV 10 without translation (that is, rotate in place). The control algorithms for controlling the straight-ahead movement, turning, and rotating AGV 10 are well known, as will be understood and employed by persons familiar with battery powered vehicles.

An AGV, both in general and in the context of a delivery AGV disclosed herein, in an uncontrolled, unprotected environment may have the ability to:

access information about the environment (such as maps of streets, sidewalks, and buildings, and in some cases building interiors);

detect people, obstacles (such as curbs, steps, bumps, slopes, and the like), objects (such as landscaping, gates, and the like), and surfaces (such as lawns, cobblestones, sidewalk cracks and discontinuities, and the like), and then evaluate and take action based on the detection; and travel under its own power to way points, usually by battery power and without human navigation assistance, taking into account the above information and detection.

In some circumstances, an AGV's onboard control system may be able to autonomously learn, such as adjusting strategies based on input about the surroundings, adapt to surroundings without outside assistance, and the like.

A particular subset of autonomous ground vehicles is an AGV that navigates to a desired residential or commercial location to carry an object, such as a package containing a commercial product. For example, United States Patent Publication Number 20180024554, titled "Autonomous Ground Vehicles Based At Delivery Locations," which is assigned to the assignee of the present invention, discloses AGVs that retrieve items from transportation vehicles (e.g., delivery trucks) for delivery to specified locations (e.g., user residences, a commercial business, etc.). In various implementations, the AGVs may be owned by individual users and/or may service a group of users in a given area (e.g., in an apartment building, neighborhood, etc.). The AGVs may travel out (e.g., from a user's residence, apartment building, etc.) to meet a transportation vehicle (e.g., a delivery truck on the street) to receive items, and may be joined by other AGVs that have traveled out to meet the transportation vehicle, and may line up in a particular order (e.g., according to delivery addresses, etc.). After the items are received, the AGVs may travel back (e.g., to the user residences) to deliver the items, and may be equipped to open and close access barriers (e.g., front doors, garage doors, etc.). The AGV may also be equipped with a locked lid that can be opened only by an intended recipient.

The present invention uses the phrase "delivery AGV" or "AGV for package delivery" or other combinations of the terms "AGV" and "delivery" to refer to AGVs having the structure, capabilities and function to navigate to a desired location, such as by navigating public or private sidewalks or neighborhoods, to transport a package to a desired customer or residential or commercial location. Accordingly, a delivery AGV includes an internal chamber for holding a package payload and is limited in speed, such as to 6 mph, 10 mph, or 15 mph, as determined by the particular design guidelines and possibly by state regulation. In this regard, these speeds are referred to herein as low speed.

The control system includes sensors and other components and systems used for navigation and guidance, avoiding objects, image-capture and sensing, power management, communications, security, and other functions inherent in achieving the goals of a delivery AGV. Sensors can be mounted behind a forward facing panel and/or a rearward facing panel (not shown). Sensors can include cameras having images sensors including image signal processing, light sensors, and the like, with corresponding processing including image decoding, lens correction, geometrical transformation, video stream transcoding, video analytics, image capture, and compression to provide obstacle detection and obstacle identification. Sensors for determining speed may also be employed. Panels can be transparent polymer, such as (for example) acrylic, Plexiglas, or polycarbonate.

Sensors can include RADAR sensors, such as SRR (Short-range radar) applications and MRR/LRR (mid-range radar, long-range radar) applications; LIDAR sensors, such as infrared LIDAR systems that with the aid of a Micro-Electro-Mechanical System (MEMS), which use a rotating laser, or a solid-state LIDAR. Control system can also include GPS modules, inertial guidance modules such as an inertial measurement unit (IMU) having gyroscopes and accelerometers (preferably in each of the x, y, and x directions), power management modules to control power, overall consumption, and thermal dissipation. Other modules, components and functions are contemplated.

Control system and sensors may also be employed in controlling the driving and turning of AGV 10 during normal conditions. For example, a speed sensor on the wheels, sensors on motor current and/or voltage, GPS, accelerometer, gyroscope, optical sensors, and the like may be employed to determine a safe straight-ahead speed, safe turning radius and velocity for the vehicle and package (taking into account the possibility of encountering a person who might not see or be expecting the vehicle), safe stopping distance to provide feedback to the controller for determining the speed, and the like.

Control system may also include a package delivery module and corresponding sensors. For example, a sensor can be associated with a closed position of lid to assure that a package to be delivered to a residential or commercial destination is secure in chamber during transport. A means for unlocking a lock on lid (or unlocking a actuator for lid or like means) can include a keypad, a wireless communication system (for working with Wi-Fi, cellular data, Bluetooth, NFC, or other communication means to send a signal to the lock upon verification), a facial or fingerprint recognition module, or the like may also be included.

Control system can control the movement of AGV to a desired destination, the delivery of a package within chamber to an authorized recipient, and/or movement of AGV 10 to a home location. In this regard, the description of control system and sensors, and United States Patent Publication Number 20180024554 and/or industry practice in view of the present disclosure may inform the functions in this regard.

Throughout the specification, reference numbers are used to structure or components. A letter is appended to refer to particular ones of the structure or component. For example, the letters L or R are appended to the reference number when referring to left and right versions; the letters i or d are appended to the reference number when referring to inlet and discharged versions. When there are reference numbers using an appended letter, the bare reference number (without appended letter) is used to refer to the structure generally or as a whole.

The present invention is illustrated employing particular structure and function. The present invention is not limited to the structure and function specifically described herein. Rather, person familiar with the technology will understand variations encompassed by the description. According, it is intended that the claims be given their full scope.

We claim:

1. An autonomous ground vehicle (AGV) having a drainage system, the AGV comprising:
 a lower body including a chassis and panels attached to the chassis, the lower body including a lower body drain outlet; and
 a cargo bay housing including a cargo bay including an open top, a sloped bottom panel that includes raised dimples, and a cargo bay drain outlet in a bottom one of the panels,
 wherein the lower body forms a cooling air path that:
  is formed by ribs on the bottom panel and portions of the chassis,
  includes an air intake path including an air inlet bend, and
  includes an air discharge path including an air outlet bend,
  wherein the air inlet and outlet bends inhibit water ingress above the air inlet and outlet bends to shield components within the lower body from water contact.

2. An autonomous ground vehicle (AGV) having a drainage system, the AGV comprising:
 a lower body including a chassis, the lower body including a lower body drain outlet;
 a cargo bay housing including a cargo bay including an open top, a sloped bottom panel that includes raised dimples, and a cargo bay drain outlet, the cargo bay drain outlet draining to the lower body drain outlet; and
 a lid having a closed position in which the lid covers the open top of the cargo bay and an open position in which the cargo bay is accessible.

3. The AGV of claim 2, further comprising a hold-down assembly including a body and a mount, wherein:

the hold-down assembly body is located at an opening in a cargo bay flange such that the hold-down assembly body is adapted for releasably securing the lid in the closed position, the mount:
- connects the hold-down assembly body to the cargo bay flange;
- enclosing encloses an underside of the opening in the cargo bay flange; and
- including includes a hold-down assembly drain outlet, and water entering the opening in the cargo bay flange about the hold-down assembly body is captured by the mount and guided to the hold-down assembly drain outlet.

4. The AGV of claim 3, wherein the hold-down assembly body comprises an electromagnet.

5. The AGV of claim 3, wherein the hold-down assembly body comprises a releasable latch.

6. The AGV of claim 3, wherein the hold-down assembly drain outlet is in fluid communication with the lower body drain outlet.

7. The AGV of claim 2, further comprising a seal about a peripheral flange of the cargo bay, an actuated hinge for lifting the lid relative to the cargo bay.

8. The AGV of claim 7, wherein the lid includes a peripheral lip sloped downwardly to shed water.

9. The AGV of claim 2, further comprising panels attached to the chassis, and an air intake opening formed in one of the panels and adapted for receiving cooling air, the lower body including air intake walls that form an inlet air path that includes an upward bend having an outlet that is offset from the air intake opening, the upward bend inhibiting water ingress above the upward bend to shield components within the lower body from water contact.

10. The AGV of claim 9, wherein the air intake walls are formed by ribs of the one of the panels and by a portion of the chassis.

11. The AGV of claim 10, wherein the chassis has an opening at the upward bend.

12. The AGV of claim 9, further comprising an air outlet opening formed in the one of the panels and adapted for discharging cooling air, the lower body including air outlet air path walls forming an air outlet path that includes an air outlet bend, the air outlet bend being offset from the air outlet opening, the air outlet bend inhibiting water ingress above the air outlet bend to shield components within the lower body from water contact.

13. The AGV of claim 12, wherein the air outlet walls are formed by ribs of the one of the panels and by a portion of the chassis.

14. The AGV of claim 13, wherein the one of the panels forms a portion of a floor of the air outlet path that is sloped toward the lower body drain outlet.

15. The AGV of claim 14, wherein the chassis has an opening at the air outlet bend.

16. The AGV of claim 2, wherein the lower body includes panels attached to the chassis, wherein the panels are configured such that water entering the panels flows to the lower body drain outlet.

17. An autonomous ground vehicle (AGV) having a drainage system, the AGV comprising:
- a lower body including a chassis and panels attached to the chassis, the lower body including a lower body drain outlet;
- an air intake opening formed in one of the panels and adapted for receiving cooling air, the lower body including air intake walls that form an inlet air path that includes an upward bend having an outlet that is offset from the air intake opening, the upward bend inhibiting water ingress above the upward bend to shield components within the lower body from water contact; and
- an air outlet opening formed in the one of the panels and adapted for discharging cooling air, the lower body including air outlet walls forming an air outlet path that includes an air outlet bend, the air outlet bend being offset from the air outlet opening, the air outlet bend inhibiting water ingress above the air outlet bend to shield components with the lower body from water contact.

18. The AGV of claim 17, wherein:
- the air intake walls are formed by first ribs of the one of the panels and by a first portion of the chassis, and
- the air outlet walls are formed of second ribs of the one of the panels and a second portion of the chassis.

19. The AGV of claim 18, wherein the chassis has an opening at the air inlet bend and another opening at the air outlet bend.

20. The AGV of claim 19, wherein the one of the panels forms a portion of a floor of the air outlet path that is sloped toward the lower body drain outlet.

* * * * *